United States Patent [19]
Hasebe et al.

[11] Patent Number: 5,372,213
[45] Date of Patent: Dec. 13, 1994

[54] OIL CIRCULATING SYSTEM FOR ELECTRIC VEHICLE

[75] Inventors: Masahiro Hasebe, Anjo; Yoshinori Miyaishi, Okazaki; Satoru Wakuta, Anjo; Yukihiro Minezawa, Okazaki; Takeshi Hara, Chiryu; Shigeo Tsuzuki, Takahama, all of Japan

[73] Assignee: Aisin Aw Co., Ltd., Japan

[21] Appl. No.: 965,940

[22] Filed: Oct. 23, 1992

[30] Foreign Application Priority Data

Oct. 24, 1991 [JP] Japan .................. 3-303834
Dec. 25, 1991 [JP] Japan .................. 3-342562
Sep. 14, 1992 [JP] Japan .................. 4-244773

[51] Int. Cl.⁵ .................................... B60K 1/02
[52] U.S. Cl. ............................ 180/65.6; 310/54; 184/6.12
[58] Field of Search ............ 180/65.1, 65.5, 65.5, 180/65.7; 310/54, 60 R, 67 R, 112; 184/6.12, 6.28

[56] References Cited

U.S. PATENT DOCUMENTS

| | | | |
|---|---|---|---|
| 4,418,777 | 12/1983 | Stockton | 180/65.6 |
| 4,799,564 | 1/1989 | Iijima et al. | 180/65.6 X |
| 5,014,800 | 5/1991 | Kawamoto et al. | 180/65.6 X |
| 5,111,090 | 5/1992 | Otake et al. | 310/54 |
| 5,127,485 | 7/1992 | Wakuta et al. | 180/65.6 X |
| 5,156,579 | 10/1992 | Wakuta et al. | 180/65.6 X |

FOREIGN PATENT DOCUMENTS 1258716 9/1986 U.S.S.R. ............... 180/65.5

Primary Examiner—Brian L. Johnson
Attorney, Agent, or Firm—Lorusso & Loud

[57] ABSTRACT

An electric vehicle includes a drive motor for generating a output drive torque, a torque transmission train for transmitting the output torque to the drive wheels of the electric vehicle and an oil circulating circuit for feeding oil to the drive motor and the torque transmission train. The oil circulating circuit includes: a mechanical drive unit driven by the torque transmission train and adapted to be driven by the rotation of the running motor; and an electric prime mover separate from and in addition to the drive motor.

5 Claims, 29 Drawing Sheets

Torque Map

Characteristics of Pump Motor

OIL CIRCULATING SYSTEM FOR ELECTRIC VEHICLE

BACKGROUND OF THE INVENTION

1. Field of the Invention

The present invention relates to an electric vehicle which is free of the noises and noxious exhaust gases associated with an internal combustion engine.

2. Description of the Prior Art

An electric vehicle carries a battery for feeding an electric current to the motor which supplies an output torque to drive the vehicle.

One problem associated with electric vehicles is that heat is evolved from the coil of the motor when the motor of the electric car is energized. As the size of the motor is reduced and/or its output power increased, the problem of heat evolution becomes more acute. One solution to this problem is that disclosed in U.S. Pat. No. 4,418,777 wherein an electric car is equipped with an oil pump for circulating oil through the motor to cool the motor coil and to lubricate parts in sliding contact within the motor and within the torque transmission train including the differential mechanism and the reduction gear mechanism. However, in this prior system an electric oil pump is used for circulating the cooling/lubricating oil which makes it difficult to run the electric car because the feed of the cooling/lubricating oil is interrupted if the electric oil pump malfunctions.

SUMMARY OF THE INVENTION

It is, therefore, an object of the present invention to solve the above-specified problems accompanying the electric vehicle of the prior art and to provide a cooling system within an electric vehicle which can cool the motor while lubricating the mechanical portions within the motor casing such as the differential mechanism and the reduction gear mechanism, even if the electric oil pump malfunctions.

According to the present invention, the above-specified object can be achieved by an electric car including: a drive motor for generating a drive output torque; a torque transmission train for transmitting the output torque to the drive wheels of the electric car; and an oil circulating system for feeding oil to the drive motor and the torque transmission train. The oil circulating system includes: a mechanical drive unit, connected to the torque transmission train and adapted to be driven by the rotation of the drive motor; and an electric prime mover in addition to the drive motor. Thus, oil circulation can be maintained, even when the electric prime mover malfunctions, by the mechanical drive unit driven by the rotation of the drive motor which will feed the minimum oil necessary for cooling and lubrication of the torque transmission train and the drive motor.

BRIEF DESCRIPTION OF THE DRAWINGS

Other objects and features of the present invention will become apparent from the following description to be made with reference to the accompanying drawings, in which.

DESCRIPTION OF THE PREFERRED EMBODIMENTS

Figure 2:
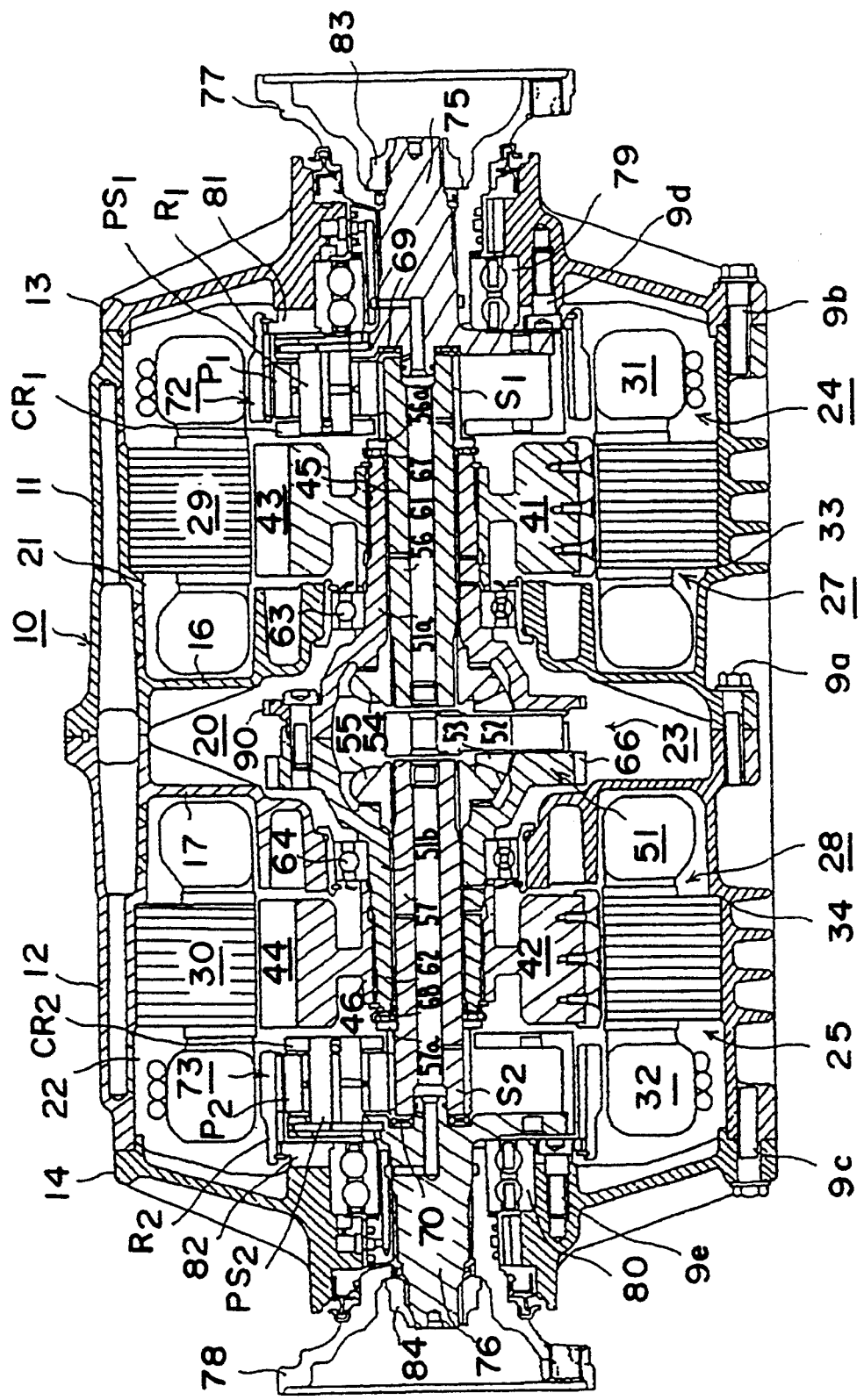
FIG. 2 is a cross-sectional view of a drive motor suitable for use in an embodiment of the present invention.
Figure 3:
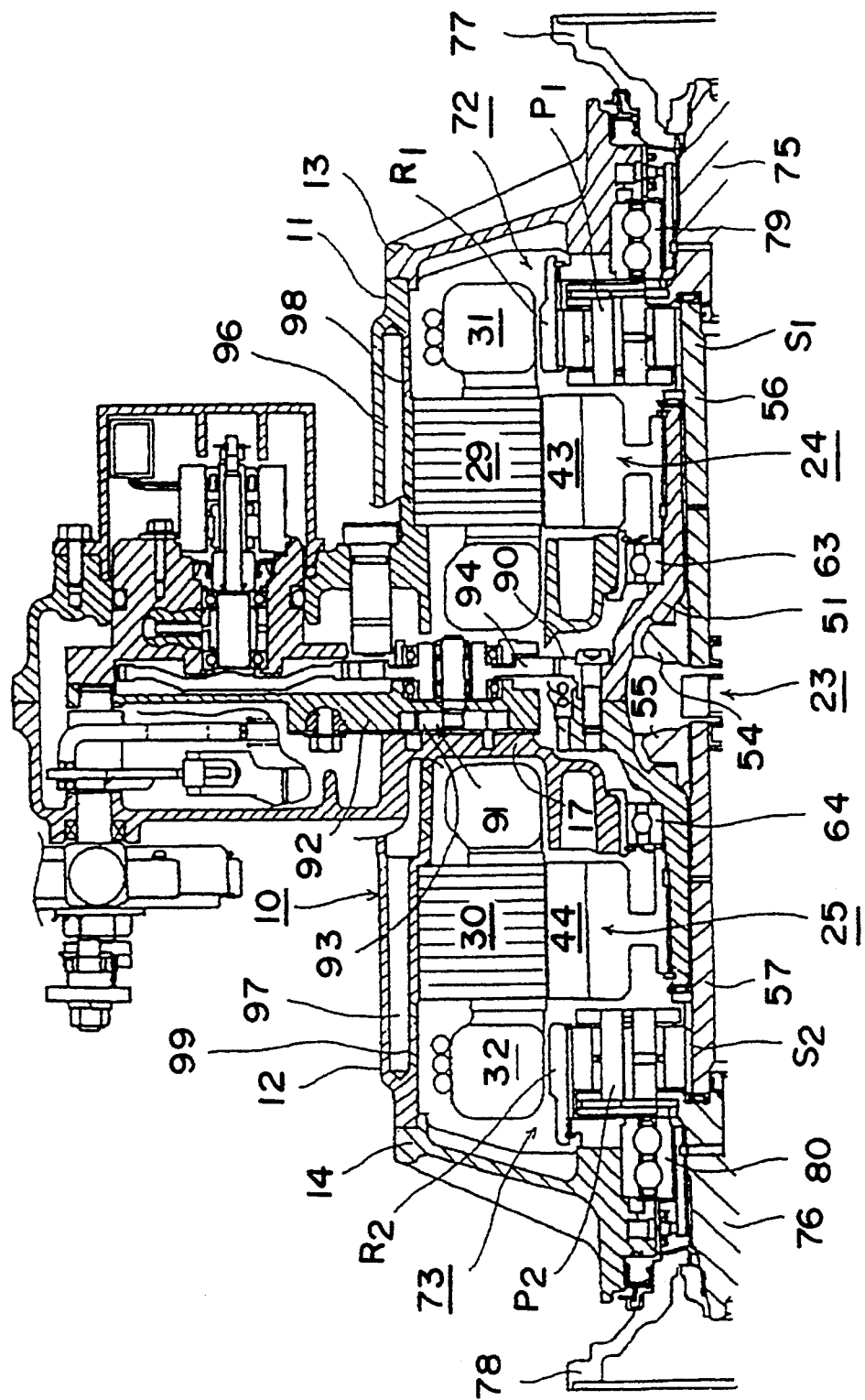
FIG. 3 is a partial cross-sectional view of the embodiment of FIG. 2 showing components important in the context of the present invention.
Figure 10:
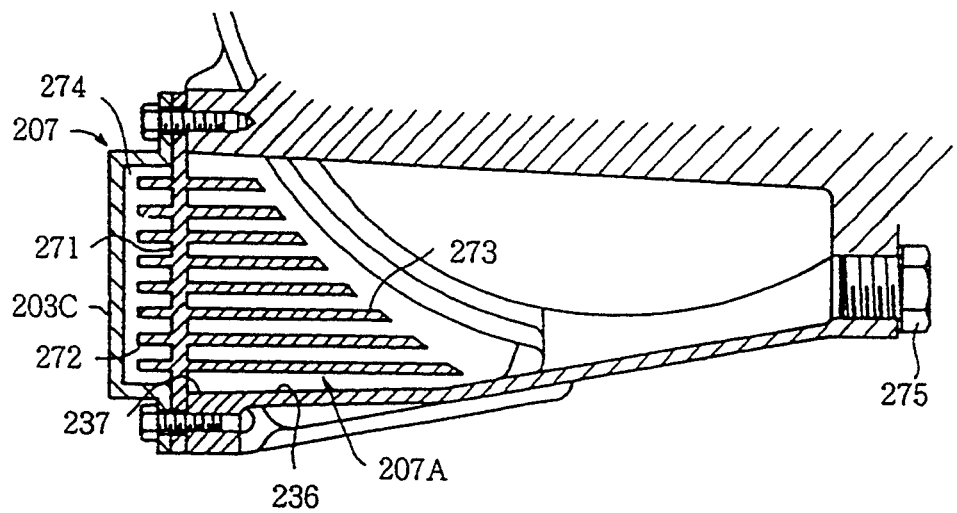
FIG. 10 is a section taken along line 10—10 of FIG. 9.

Referring to FIGS. 2 and 3, 10 designates a drive unit casing for mounting a drive unit including a first cylindrical center casing 11, a second cylindrical center casing 12, a first dish-shaped side cover 13 and a second dish-shaped cover 14. The first and second center casings 11 and 12 are formed with partitions 16 and 17 extending toward the center.

A differential mechanism chamber 20 is defined by partitions 16 and 17, and motor chambers 21 and 22 are formed between the partition 16 and the first side cover 13 and between the partition 17 and the second side cover 14. The opposed end faces of the first and second center casings 11 and 12 are joined by means of bolts 9a. The first and second side covers 13 and 14 are fixed to the first and second center casings 11 and 12 by means of bolts 9b and 9c. A differential mechanism 23 is mounted in the aforementioned differential mechanism chamber 20, and a plurality of, i.e., a pair of first and second motors 24 and 25, are mounted in the motor chambers 21 and 22. The partitions 16 and 17 are shaped to have their central portions protruding toward the drive wheels (to the right and left in the drawing), axially of the first and second motors 24 and 25, to accommodate the differential mechanism 23 in the central portion of the differential mechanism chamber 20.

The first and second motors 24 and 25 have their stators 27 and 28 fixed on the inner circumferential walls of the first and second center casings 11 and 12. The stators 27 and 28 are composed of armature cores 29 and 30 and coils 31 and 32, and the armature cores 29 and 30 are positioned close to steps 33 and 34 which are formed on the inner circumferential walls of the first and second center casings 11 and 12.

The first and second motors 24 and 25 have rotors 41 and 42 composed of permanent magnets 43 and 44 are rotatably mounted radially inward of the armature cores 29 and 30. Motors 24 and 25 also have spindles 45 and 46 supporting the permanent magnets 43 and 44. These spindles 45 and 46 are supported by the aforementioned differential mechanism 23.

Differential mechanism 23 includes differential casing 51 made of a material having a sufficient rigidity; a pinion shaft 52 mounted in differential casing 51; a pinion 53 mounted for rotation relative to said pinion shaft 52; and first and second side gears 54 and 55 arranged to mesh with said pinion 53.

The first and second side gears 54 and 55 differentiate the rotations transmitted to the differential casing 51 and transmit the differentiated rotations to first and second drive shafts 56 and 57 which are connected to left-hand and right-hand drive wheels (not shown).

Moreover, the differential casing 51 has cylindrical portions (or shafts) 51a and 51b extended around the first and second drive shafts 56 and 57 to support the aforementioned spindles 45 and 46.

The outer circumferences of the cylindrical portions 51a and 51b and the inner circumferences of the spindles 45 and 46 are splined at 61 and 62, and bearings 63 and 64 are sandwiched between the outer circumferences of the bases of the cylindrical portions 51a and 51b and the aforementioned individual partitions 16 and 17 to rotatably support the differential mechanism.

The cylindrical portions 51a and 51b and first and second drive shafts 56 and 57 are arranged coaxially for rotation relative to each other with a suitable clearance in-between.

The differential casing 51 is surrounded by parking gear 66 and pump drive gear 90.

The first and second drive shafts 56 and 57 have integrally formed rings 56a and 57a on their outside ends and thrust bearings 67 and 68 are provided between rings 56a and 57a and cylindrical portions 51 and 51b. The thrust bearings 67 and 68 enable the cylindrical portions 51a and 51b and the first and second drive shafts 56 and 57 to rotate relative to each other. First ends of the aforementioned spindles 45 and 46 bear against shoulders formed at the bases of the cylindrical portions 51a and 51b of the differential casing 51, through the inner races of the bearings 63 and 64. Thrust bearings 67 and 68 are provided between opposite ends of spindles 45 and 46 and the rings 56a and 57a.

On the drive wheel sides of these rings 56a and 57a are arranged planetary gear units 72 and 73 acting as first and second reduction gear mechanisms. These planetary gear units 72 and 73 include: sun gears $S_1$ and $S_2$ formed integrally with the drive wheel side ends of the first and second drive shafts 56 and 57; pinions $P_1$ and $P_2$ meshing with the sun gears $S_1$ and $S_2$; pinion shafts $PS_1$ and $PS_2$ supporting the pinions $P_1$ and $P_2$; carriers $CR_1$ and $CR_2$ supporting the pinion shafts $PS_1$ and $PS_2$; and ring gears $R_1$ and $R_2$ meshing with the pinions $P_1$ and $P_2$. The sun gears $S_1$ and $S_2$ are splined to the first and second drive shafts 56 and 57, and the ring gears $R_1$ and $R_2$ are splined to the first and second side covers 13 and 14.

To the axial drive wheel sides of the carriers $CR_1$ and $CR_2$ are connected transmission shafts 75 and 76, which in turn are splined to yoke flanges 77 and 78. To these yoke flanges 77 and 78 are connected drive shafts. The transmission shafts 75 and 76 are rotatably supported by the first and second side covers 13 and 14 through the yoke flanges 77 and 78 and bearings 79 and 80.

The rotations of the first and second drive shafts 56 and 57 are inputted through the aforementioned sun gears $S_1$ and $S_2$ and decelerated by the planetary gear sets 72 and 73 and then output through the carriers $CR_1$ and $CR_2$ to the transmission shafts 75 and 76. First and second drive shafts 56 and 57 rotate relative to the transmission shafts 75 and 76, with thrust bearings 69 and 70 arranged in-between.

Thus, in the planetary gear units 72 and 73, the rotations are inputted from the first and second drive shafts 56 and 57 to the sun gears $S_1$ and $S_2$ so that the decelerated rotations are output from the carriers $CR_1$ and $CR_2$. Drive wheels are connected to the yoke flanges 77 and 78 through a drive shaft.

When the first and second motors 24 and 25 are energized, the rotors 41 and 42 rotate the differential casing 51 through the splines 61 and 62. These rotations are differentiated in the differential mechanism 23 and are transmitted through the first and second side gears 54 and 55 to the first and second drive shafts 56 and 57.

The rotations thus transmitted to the first and second drive shafts 56 and 57 are input to and decelerated by the sun gears $S_1$ and $S_2$ of the planetary gear units 72 and 73 and are output from the carriers $CR_1$ and $CR_2$. The rotations thus output from the carriers $CR_1$ and $CR_2$ are transmitted through the transmission shafts 75 and 76 and the yoke flanges 77 and 78 to the drive wheels to run the electric vehicle.

The drive unit thus constructed uses the planetary gear units 72 and 73 to decelerate the rotations of the first and second motors 24 and 25. In order to suppress the gear noise generated within the planetary gear units 72 and 73, helical gears are used in the planetary gear units 72 and 73 to improve the meshing efficiencies.

Incidentally, reference characters 9d and 9e designate bolts, numerals 81 and 82 designate ring gear flanges and other numerals designate nuts.

Planetary gear units 72 and 73 have their pinions $P_1$ and $P_2$ meshing with the sun gears $S_1$ and $S_2$ and the ring gears $R_1$ and $R_2$. Differential mechanism 23 has its first and second side gears 54 and 55 meshed with the pinion 53. Moreover, the differential casing 51 is supported by the bearings 63 and 64, and the transmission shafts 75 and 76 are rotatably supported through the yoke flanges 77 and 78 and the bearings 79 and 80 by the first and second side covers 13 and 14.

Differential mechanism 23 is supported through the bearings 63 and 64 by the first and second center casings 11 and 12.

In order to remove the frictional heat evolved when first and second motors 24 and 25 are energized, in an upper portion of the drive unit casing 10, between the coils 31 and 32 of the first and second motors 24 and 25, is provided a mechanical oil pump 91. This mechanical oil pump 91 includes a pump chamber, defined by a pump cover 92 formed on the partition 17, and a rotor 93 in the pump chamber. The rotor 93 is connected outside of the pump cover 92 to a pump driven gear 94 meshing with the aforementioned pump drive gear 90.

When the first and second motors 24 and 25 are energized, their rotations are transmitted through the differential casing 51, the pump drive gear 90 and the pump driven gear 94 to the rotor 93 to actuate the mechanical oil pump 91. The oil thus discharged by the mechanical oil pump 91 is fed through the oil passages in the first and second drive shafts 56 and 57 to lubricate the individual members mounted in the drive unit casing 10.

In order to prevent first and second motors 24 and 25 from overheating, annular oil chambers 96 and 97 are formed in the drive unit casing 10 above the first and second motors 24 and 25. Moreover, the annular oil chambers 96 and 97 are provided in their inner walls with oil ports 98 and 99, from which cooling oil is injected into the drive unit casing 10 to directly cool the coils 31 and 32.

The annular oil chambers 96 and 97 also receive cooling oil from a separate oil pump to be to be later described.

Figure 1:
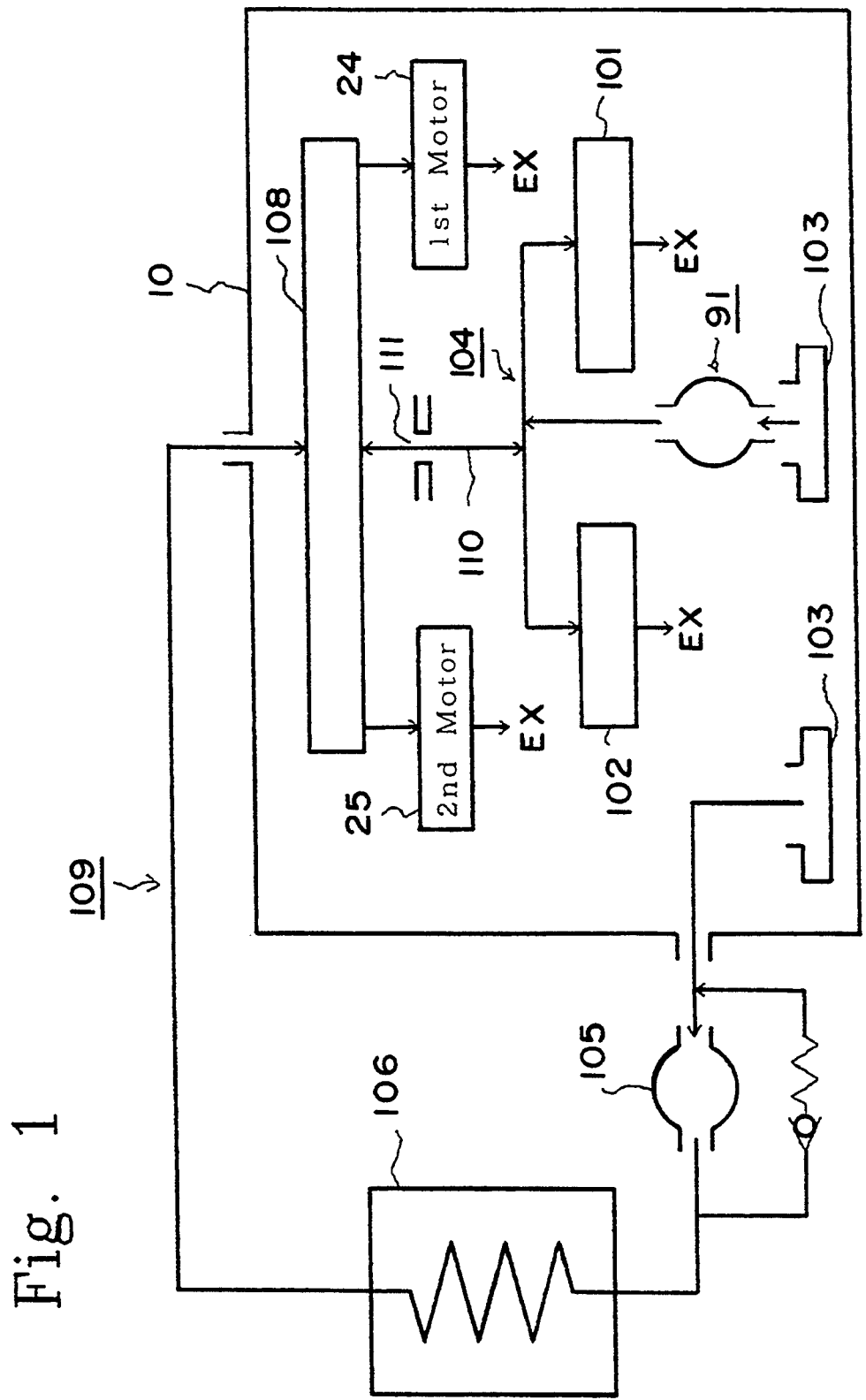
FIG. 1 is a cooling/lubricating circuit diagram showing an electric vehicle according to an embodiment of the present invention.
Figure 24:
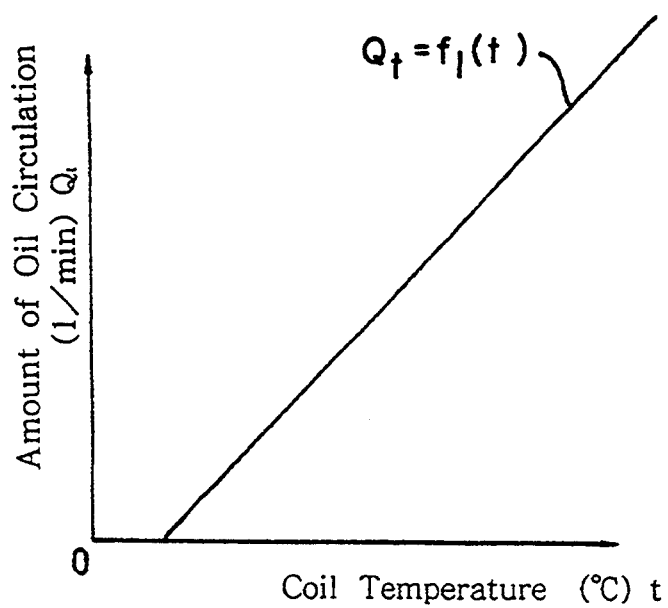
FIG. 24 is a map for computing the amount of oil circulation responsive to a coil temperature.
Figure 25:
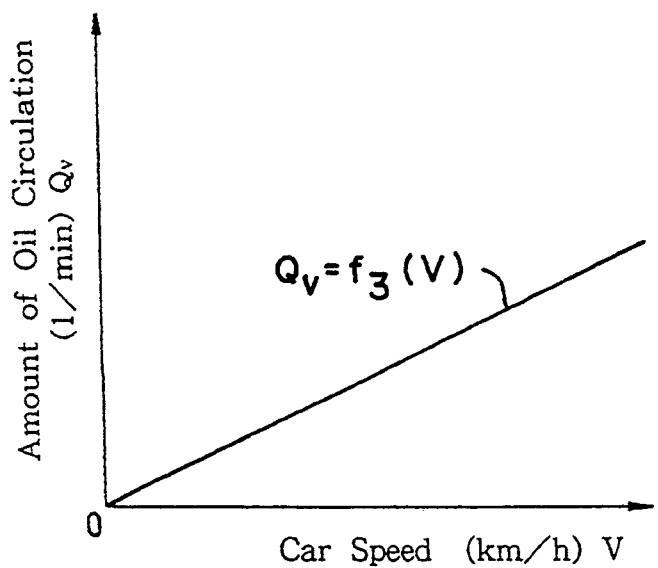
FIG. 25 is a map for computing the amount of oil circulation for cooling the frictional surfaces of the electric motor components.
Figure 26:
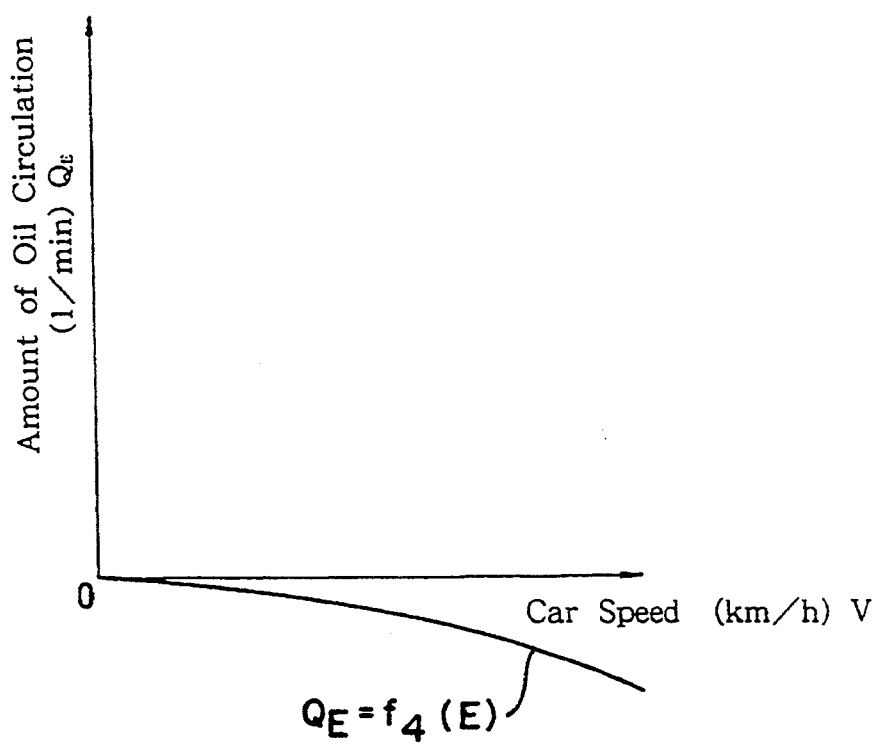
FIG. 26 is a map for computing the amount of oil circulation against heat evolution from the electric motor casing.

In FIG. 1, 24 and 25 designate the first and second motors; 91 designates the mechanical oil pump; 101 designates a member to be lubricated arranged at the side of the first motor 24; 102 designates a member arranged to be lubricated at the side of the second motor 25; and 103 designates an oil sump. Members 101 and 102 are lubricated by oil discharged by the mechanical oil pump 91. The mechanical oil pump 91 and members 101 and 102 together form a lubrication circuit 104.

Electric oil pump 105 is driven by a third motor 105' which is provided as a cooling motor separately of the aforementioned first and second motors 24 and 25. A cooler 106 cools the cooling oil, and a header 108 distributes oil received from cooler 106 to the annular oil chambers 96 and 97 (as shown in FIG. 3). The oil collected by the oil distributer (header) 108 is injected through the annular oil chambers 96 and 97 into the drive unit casing 10. The pump 105, cooler 106, header 108 and first and second motors 24 and 25 together form a cooling circuit 109.

Connecting the lubrication circuit 104 and the cooling circuit 109 is an oil passage 110 which is equipped with means for controlling the flow rate of oil, such as an orifice 111.

Since the aforementioned mechanical oil pump 91 is driven by the differential casing 51, as has been described above, the flow rate of oil discharged increases as the RPM of the differential casing 51 increases with higher vehicle speed. As a result, the lubrication circuit 104 is fed with a sufficient amount of oil.

Excess oil from circuit 104 can be fed through the oil passage 110 and orifice 111 to the cooling circuit 109 while interrupting operation of the electric oil pump 105. As a result, power consumed by the third motor 105 is reduced. Incidentally, the flow rate of oil can be controlled by changing the diameter of the orifice 111.

At low vehicle speed, on the other hand, the RPM of the differential casing 51 and the flow oil discharged by mechanical pump 91 is reduced accordingly. When the vehicle is stopped the differential casing 51 is not rotated so that the electric car would start without oil from pump 91. Likewise, in reverse running, the mechanical oil pump 91 has its rotor 93 rotated backward so that no oil is discharged. In these situations, the oil of the cooling circuit 109 is fed through the aforementioned oil passage 110 and orifice 111 to the lubrication circuit 104 so that the members 101 and 102 are prevented from overheating due to shortage of lubrication at low speed running and in reverse running. Thus, the electric vehicle is never started without oil lubrication, and a sufficient amount of oil is circulated in reverse and at low speed.

Next, a second embodiment of the present invention will be described.

In this second embodiment, the electric vehicle is equipped with a control unit (not shown) for controlling the operation of the electric oil pump 105 (as shown in FIG. 1). This control unit is composed of a CPU, a RAM and a ROM. The ROM stores the initial lubrication map and the vehicle speed versus lubrication map.

Figure 4:
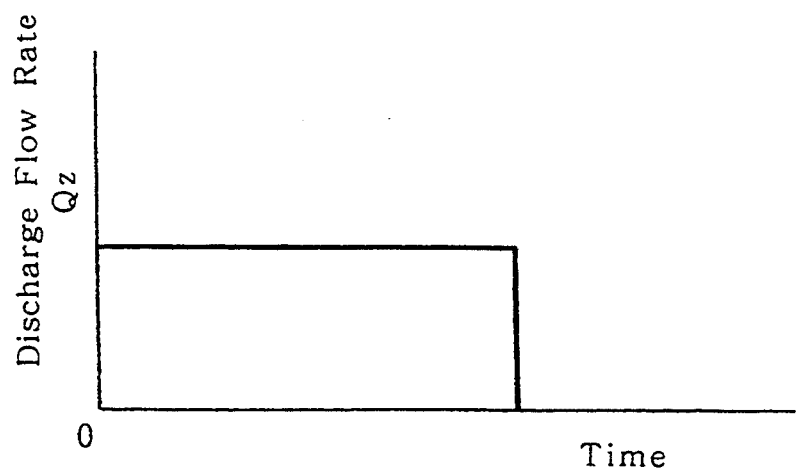
FIG. 4 is a graph illustrating the initial oil flow rate from an electric oil pump.
Figure 5:
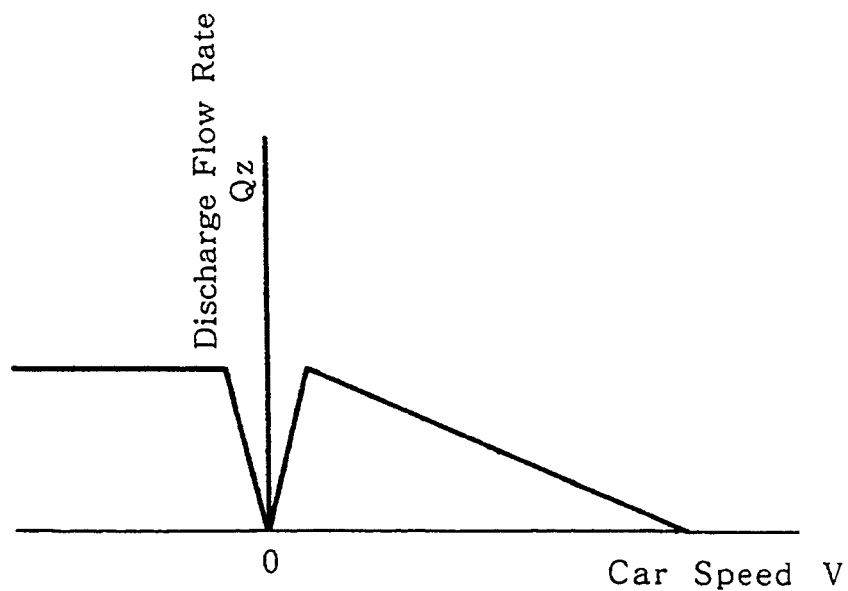
FIG. 5 is a graph showing the flow rate for lubrication oil against vehicle speed.
Figure 6:
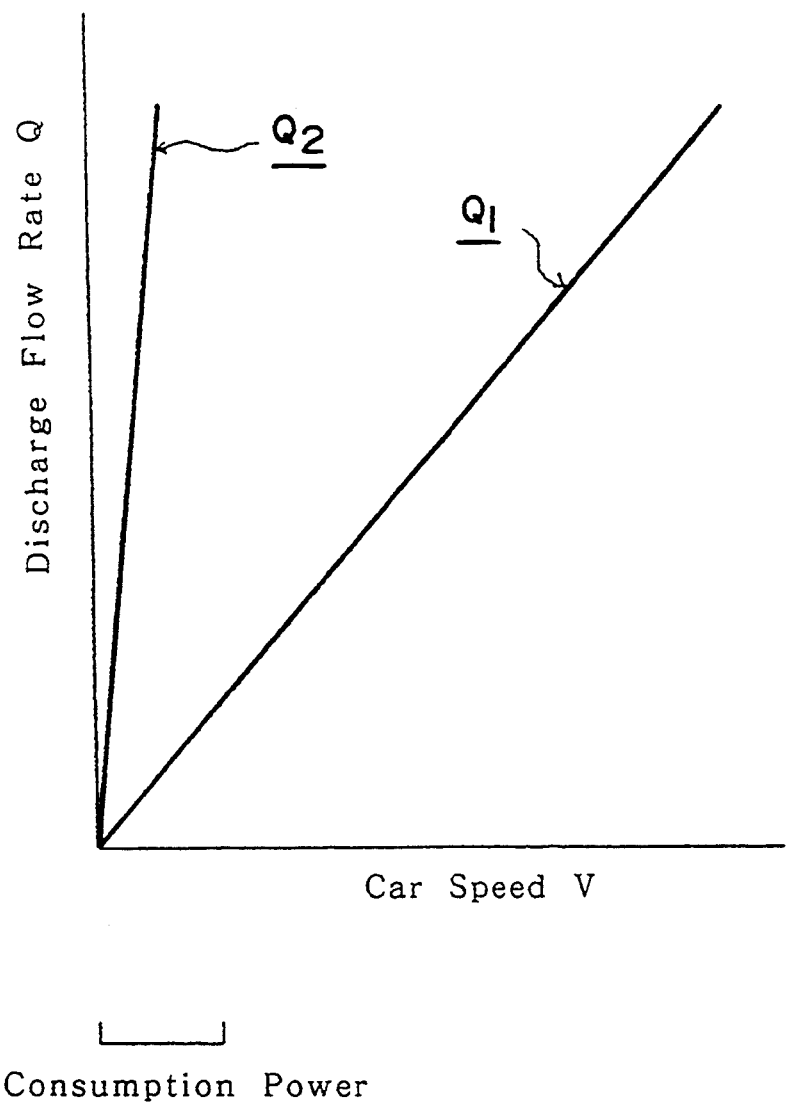
FIG. 6 is a graph illustrating flow rates of lubricating oil against vehicle speed and power consumption.

The control unit operates the electric oil pump 105 for a preset time period, when the electric car is started, to feed the individual members 101 and 102 in the drive unit casing 10 with the lubrication oil through the oil passage 110 and the orifice 111. The discharge flow rate of the electric oil pump 105 is always held constant, as shown in FIG. 4.

In low speed running of the electric vehicle too, the electric oil pump 105 is operated to feed the lubrication oil to the individual members 101 and 102 in the drive unit casing 10 through the oil passage 110 and the orifice 111. In this low speed running, the electric oil pump 105 is driven to ensure a discharge flow rate $Q_2$ corresponding to a car speed V so that the lubrication oil is discharged at the higher flow rate as the car speed V comes the closer to 0 [km/h] and at the lower flow rate as the car speed v becomes higher. In contrast, the mechanical oil pump 91 discharges the oil at a lower flow rate as the vehicle speed v approaches 0 [km/h] and at a higher flow rate as the car speed v becomes higher.

Thus, oil is discharged at the discharge flow rate $Q_2$ from the electric oil pump 105 and at a discharge flow rate $Q_1$ from the mechanical oil pump 91.

In reverse also, the electric oil pump 105 is driven to feed the lubrication oil to the individual members 101 and 102 in the drive unit casing 10 through the oil passage 110 and the orifice 111. In reverse, the discharge flow rate is constant, independent of the car speed v.

Both the aforementioned mechanical oil pump 91 and the electric oil pump 105 intake oil from the oil sump 103. This oil sump 103 is wide and elongated to retain a good road clearance for the electric vehicle.

Figure 7:
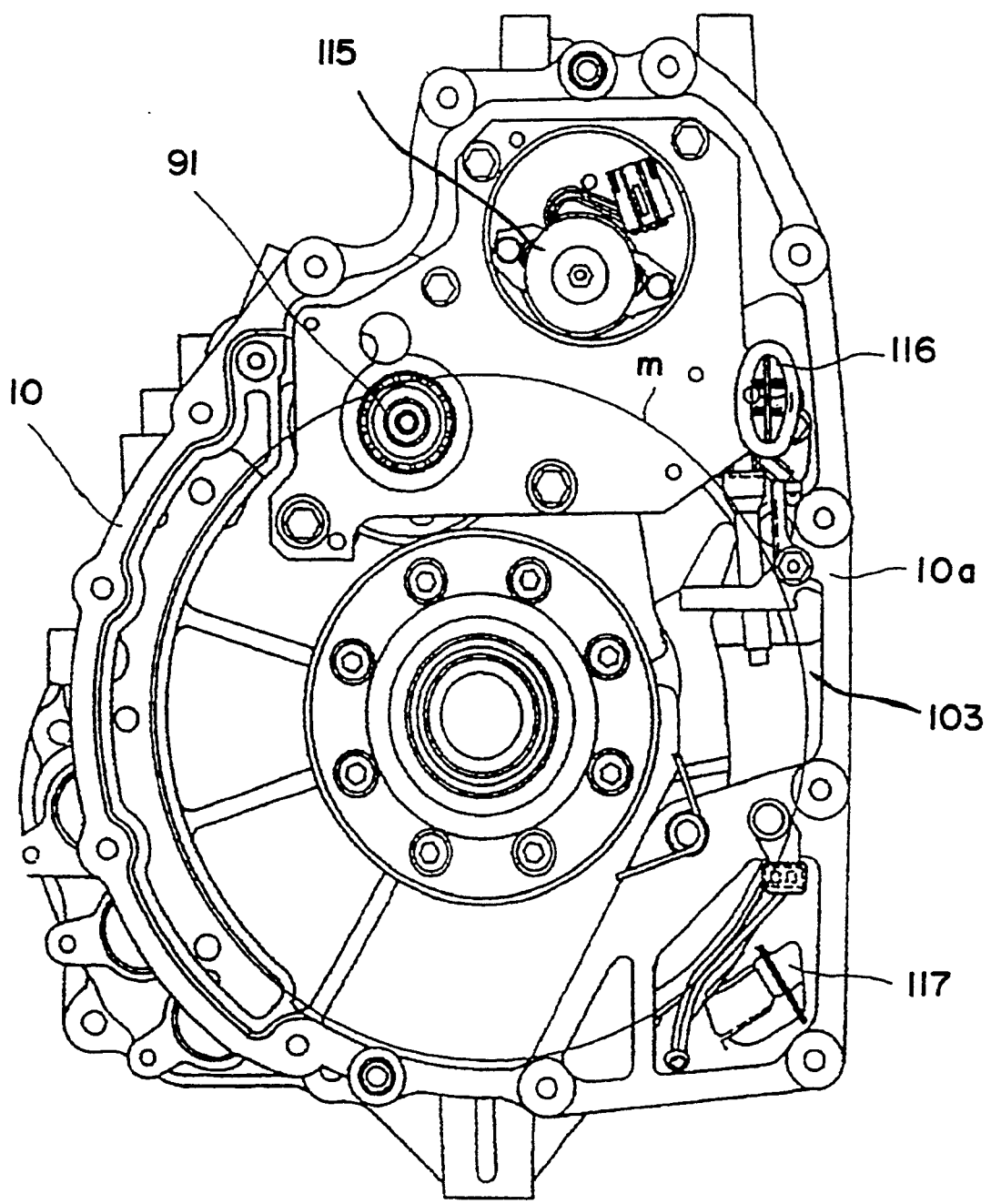
FIG. 7 is a transverse cross-sectional view of a drive motor for an electric vehicle according to the embodiment of FIGS. 2 and 3
Figure 8:
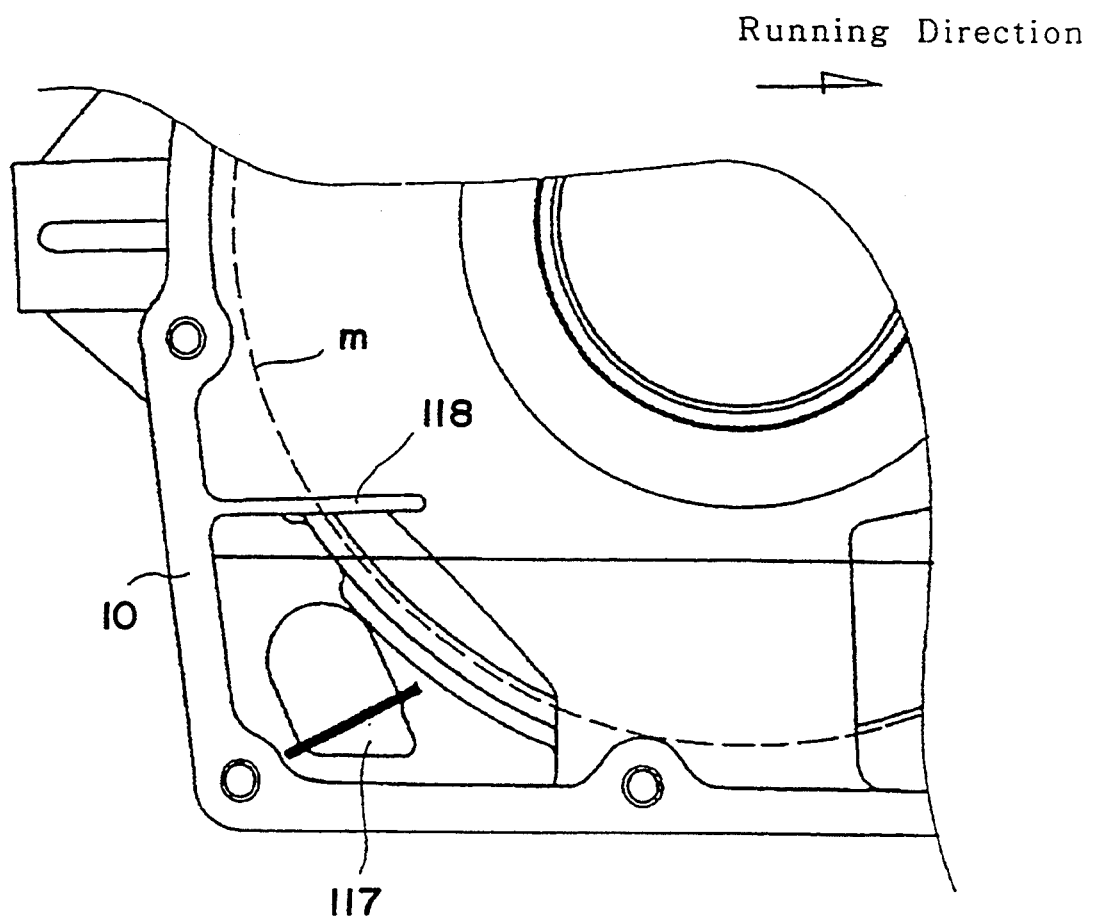
FIG. 8 is an enlarged portion of FIG. 7 better showing a strainer.

In FIGS. 7 and 8, 10 designates the drive unit casing; 91 designates the mechanical oil pump; 103 designates the oil sump; 115 designates a resolver; and m designates the outer circumferential edges of the stators 27 and 28 (as shown in FIG. 2). The oil sump 103 is arranged in the vicinity of the outer circumferential edges of the stators 27 and 28 to retain the road clearance of the electric car. In order to hold a sufficient amount of oil, moreover, the drive unit casing 10 has its bottom face flattened to provide a wide and long oil sump 103.

If the oil sump 103 is thus formed, the gap between the outer circumferential edges m of the stators 27 and 28 and the bottom 10a of the drive unit casing 10 is reduced. Thus, a strainer 116 for the mechanical oil pump 91 is arranged in the aforementioned oil sump 103 below the mechanical oil pump 91, and a strainer 117 for the electric oil pump 105 (as shown in FIG. 1) is arranged in the oil sump 103 at the rear of the electric vehicle.

At a low speed running of the electric vehicle, the electric oil pump 105 is driven to feed the cooling oil to the first and second motors 24 and 25. During uphill running and in abrupt starting the running conditions are especially severe for the first and second motors 24 and 25. Under such conditions, because the strainer 117 for the electric oil pump 105 is disposed at the back of the oil sump 103, it can be sufficiently immersed in the oil in the oil sump 103 if the oil in the oil sump 103 moves backward during the uphill running or abrupt starting. As a result, it is possible to feed the first and second motors 24 and 25 with oil in an amount sufficient to prevent air from being sucked into the strainer 117.

As shown in FIG. 8, a rib 118 is formed above and close to the aforementioned strainer 117. This rib 118 protrudes horizontally from the drive unit casing 10 and toward the front of the electric vehicle to cover the strainer 117. As a result, the strainer 117 is immersed in oil if the oil in the oil sump 103 moves backward upon uphill running or abrupt starting. This construction further prevents air from entering into the strainer 117.

Next, a second embodiment of the present invention will be described with reference to FIG. 9. The drive unit of this embodiment is an inboard type, as shown in section in FIG. 9, and includes a reduction gear mechanism 202 having a motor 201 and planetary gearing 202 connected to and driven by the motor 201; and a casing 203 in which the foregoing components are mounted. The drive unit further includes for cooling the motor 201, an oil circulating system 206 having oil passages disposed inside and outside of the casing 203 and an oil pump 261; and cooling means (refer to FIG. 10 presenting a 10—10 section of FIG. 9) for cooling the circulated oil by heat exchange. The oil circulating system 206 includes a variable capacity pump 206A for changing the amount of oil circulated responsive to the amount of heat evolved by the motor 201.

The construction of the individual components will now be described in more detail. The casing 203 is formed of a center casing 203a and two side casings 203b, and the center casing 203a has its central portion halved by a partition 231a to form two motor mounting chambers 232a. The side casings 203b close the openings 233a at the two ends of the center casing 230a and provide motor mounting chambers 231b which join motor mounting chambers 232a formed in center casing 203a. A reduction gear mechanism chamber 232b is provided for mounting the reduction gear mechanism 202. A spindle 212 supporting the rotor 211 of the motor 201 is supported at its inner end by the partition 231a of the center casing 203a through a ball bearing and at its outer end through a roller bearing in the bore of the output shaft 221 of the reduction gear mechanism 202, which in turn is supported in the through hole 233b of the side casing 203b through a ball bearing and a roller bearing.

Figure 9:
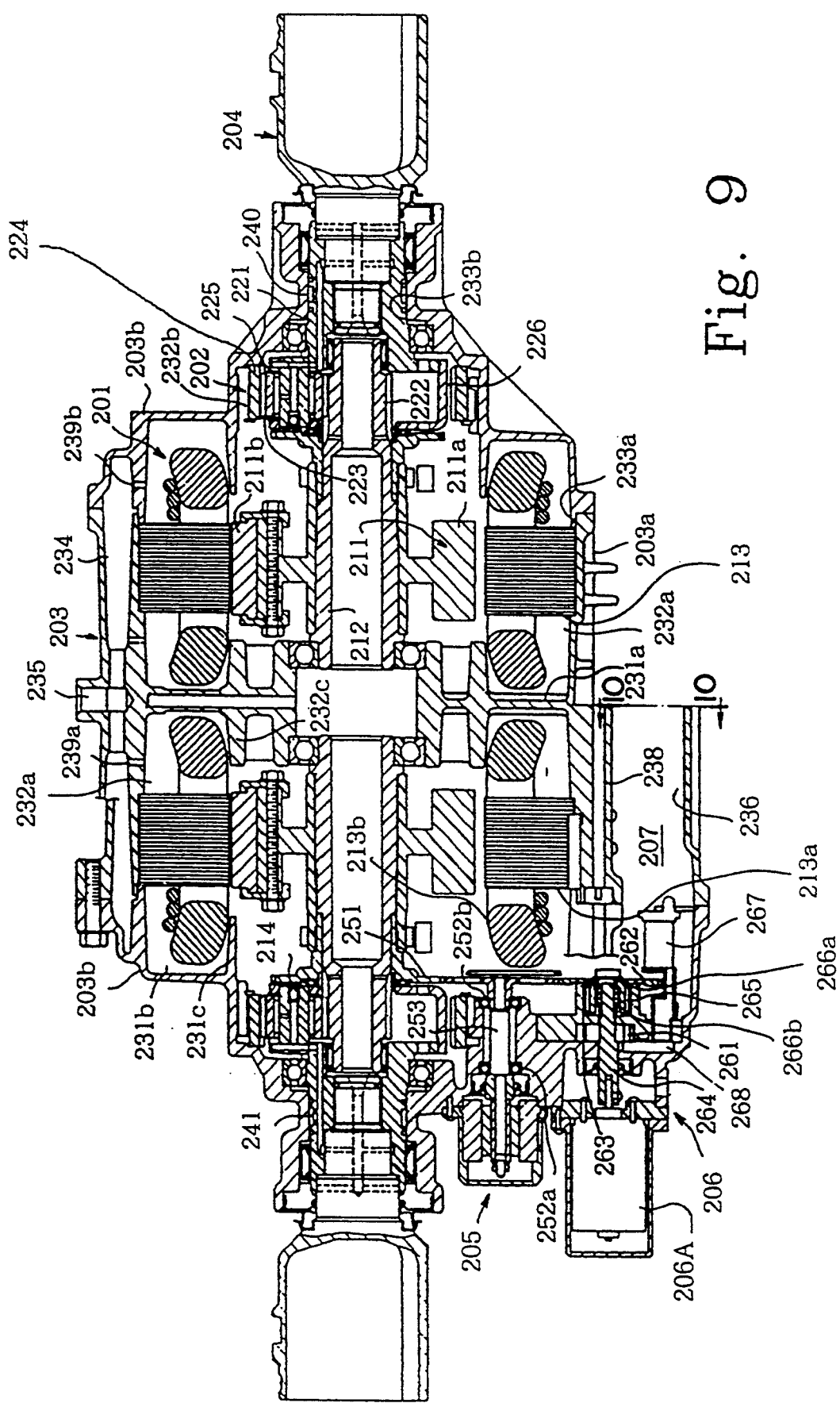
FIG. 9 is a cross-sectional view of a second embodiment of a drive motor of the present invention.
Figure 11:
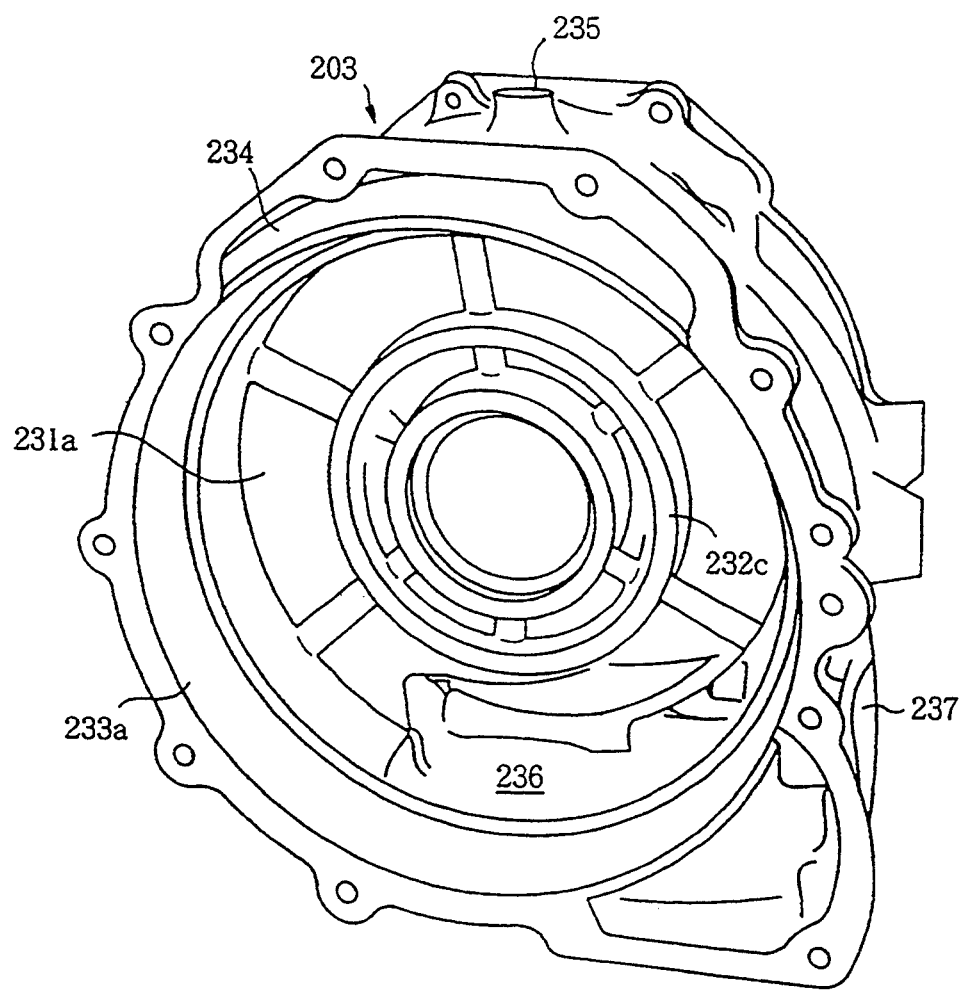
FIG. 11 is a perspective view showing the casing of the second embodiment.

As shown in FIGS. 9 and 11, the casing 203 has a double upper peripheral wall having outer and inner wall portions defining an oil passage chamber 234, and the outer wall is provided at the center (highest point) of its periphery with an intake port 235 for receiving the circulating oil. The casing 203 also has a doubled wall portion at its lower periphery with the outer wall portion being generally horizontal with a slight incline toward the end of the casing to provide an oil sump 236 at the bottom of the casing. As seen in FIG. 10, the partition 231a has a notch cut into its bottom to establish communication between the aforementioned two chambers. The oil sump 236 is open at one end, i.e. opening 237 (as shown in FIG. 10).

As shown in section in FIG. 10, a finned plate 207A for providing cooling and cover 203c are bolted to a vertical portion of the outer wall of the oil sump 236 to close opening 237. The finned plate 207A has a number of parallel fins 272 and 273 extending horizontally inward and outward of the casing from a plate portion 271 closing the opening 237. This arrangement defines a water-cooled chamber 274 between the plate 271 and the cover 203c. At the opposite end of sump 236 is a drain plug 275.

The motor 201 is composed of a rotor 211 and a stator 213. The rotor 211 has a spindle 212, a rotor body 211a splined to the outer circumference of the spindle 212 so that it is fixed for rotation therewith, and a permanent magnet 211b fixed on the outer circumference of the rotor body 211a. The stator 213 is composed of a core 213a and a coil 213b extending axially to the two sides of the core 213a. A radially reduced circumference portion of the spindle 212 has teeth and serves as a sun gear 222 for the reduction gear mechanism 202. In this embodiment, therefore, the spindle 212 acts as both the motor shaft and the sun gear 222 of the planetary gearing, i.e. reduction gear mechanism 202.

The reduction gear mechanism 202 includes a pinion gear 223 meshing with the outer circumference of the sun gear 222, and a ring gear 224 meshing with the outer circumference of the pinion gear 223. The ring gear 224 is held against rotation by being splined to the circumferential wall of the casing 203b and is axially fixed by a snap ring. A pinion shaft 225 supporting the pinion gear 223 is fixed on a carrier 226 which in turn is made integral with the output shaft 221. This output shaft 221 has its axial circumference supported in the bore 223b of the casing 203b through a ball bearing and a roller bearing.

A synchromesh joint 204 has its shaft end splined in a hollow stepped bore of the output shaft 221 for rotation therewith. An oil seal is provided between the shaft of the synchromesh joint 204 and the bore 233b of the casing 203b.

In this drive unit, the casing 203b supports a phase sensor 205. This phase sensor 205 is composed of a resolver which is driven through a shaft 253 supported by ball bearings 252a and 252b by the rotation of a spur gear 251 meshing with a spur gear 214 fixed on the circumference of the spindle 212. The resolver body is attached to the outer side of the casing 203b. The oil circulating mechanism 206 includes a spur gear 262 (or mechanical drive unit) meshing with the aforementioned spur gear 251 and supported by a roller bearing 265 and thrust washers 266a and 266b, and a pump shaft 264 connected to the aforementioned spindle 212 through a one-way clutch 263. The pump shaft 264 is also connected to the oil pump motor 206A attached to the outer side of the casing 203b. The oil discharged from the pump 261 is fed to the individual components such as the reduction gear mechanism 202 from the oil passage chamber 234 and oil passages 238, 240 and 241 and then recovered in the oil sump 236.

In the drive unit thus far described according to the aforementioned embodiment, the rotation of the rotor 211 of the motor 201 is input to the reduction gear mechanism 202 from the sun gear 222 integrated with the spindle 212, and the decelerated rotation of the carrier 226 caused by the revolution of the pinion gear 223, using the ring gear 224 as a reaction force, is output to the output shaft 221 integrated therewith and is transmitted through the synchromesh joint 2044 to the wheels. By the rotation of the spindle 212, the rotation of the spur gear 214 fixed on the spindle 212 through the rotor 211 is transmitted through the spur gear 251 of the phase sensor 205 and the pump shaft gear 262 to the oil pump shaft 264 so that the oil pump 261 is rotated at a speed determined by the rotation of the motor 201 through engagement of the one-way clutch 263.

The oil thus discharged by the rotation of the pump 261 is fed through the port 235, located at the highest point on the casing, to the oil passage chamber 234 through a pipe (not shown) arranged outside of the casing and then flows down onto the coil 213b through the oil ports 239a and 239b. The oil further flows circumferentially and downward along the guide walls 231c and 232c of the casing 203, while being heated by heat exchange with the coil 213b, and is eventually received in the oil sump 236. A portion of the oil is fed through the oil passage (not shown) formed in the casing to the oil passage 241 and further through the oil passages 238 and 240 to lubricate the reduction gear mechanism 202 and the individual bearings and is likewise eventually recovered in the oil sump 236.

The oil having returned to the oil sump 236 contacts the cooling fins 273 therein and exchanges heat with the cooling fins 273, which are cooled by the outside fluid as it flows toward a suction port 268 of the oil pump 261, so that it is sufficiently cooled before it reaches the suction port. The oil is fed through a strainer 267 from the suction port 268 to the pump 261 and repeats the circulation thus far described.

Ordinarily, this oil circulation is accomplished by the aforementioned gear drive. If the oil temperature is so high that the motor 201 stops, as when the vehicle is abruptly stopped, the oil pump motor 206A is run to provide oil circulation. At this time, the spur gear 262 is disconnected from the pump shaft 264 by the action of the one-way clutch 263. Incidentally, the running time and the R.P.M. control of the oil pump motor 206A are not specifically disclosed, but the RPM may be controlled either in accordance with the oil temperature in response to a signal from the oil temperature sensor, for example, or by predicting the rise in the oil temperature in accordance with the output of the motor 201. The pump motor 206A may be run continuously or as needed.

Figure 12:
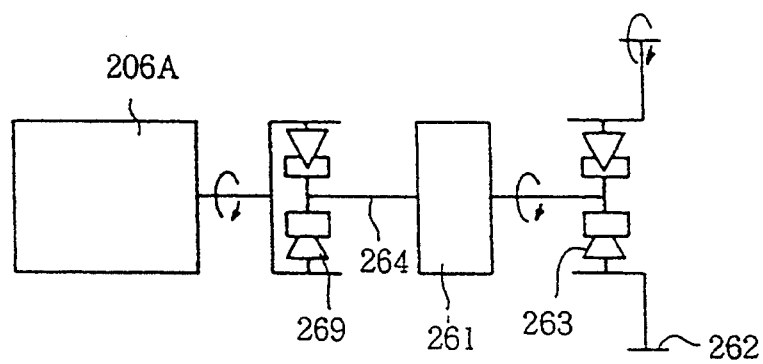
FIG. 12 is a schematic side elevation showing a third embodiment having a partially modified oil circulation changing means.

Next, a third embodiment of the present invention will be described with reference to FIG. 12. According to this embodiment, in order to reduce the drag losses within the oil pump motor 206A when the circulation changing means of the foregoing third embodiment is not running or is rotating at a lower RPM than that of the gear side input, the construction is modified by the interposition of a one-way clutch 269 between the oil pump motor 206A and the oil pump 261. With this arrangement, the oil pump motor 206A has its rotor disconnected from the pump shaft 264 when gear 262 is driven so that the pump driving loss can be further reduced.

Figure 13:
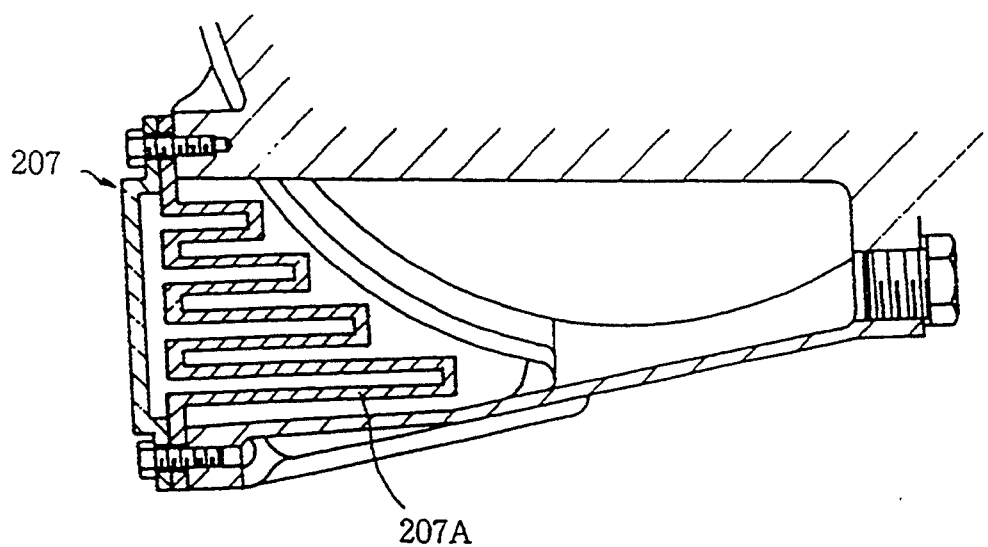
FIG. 13 is a partial section similar to FIG. 10 but showing fourth embodiment of a drive motor having a modified cooling fin arrangement.

FIG. 13 shows a fourth embodiment of the present invention, in which the heat exchange surfaces of the finned plate 207A are hollow. With this construction, the heat exchanging area per unit space can be increased to better improve the cooling effect. Incidentally, the shape of the cooling fins is not limited to those depicted in the drawings but can take any configuration that allows the oil flowing down into the sump to flow into the pump suction port.

Figure 15:
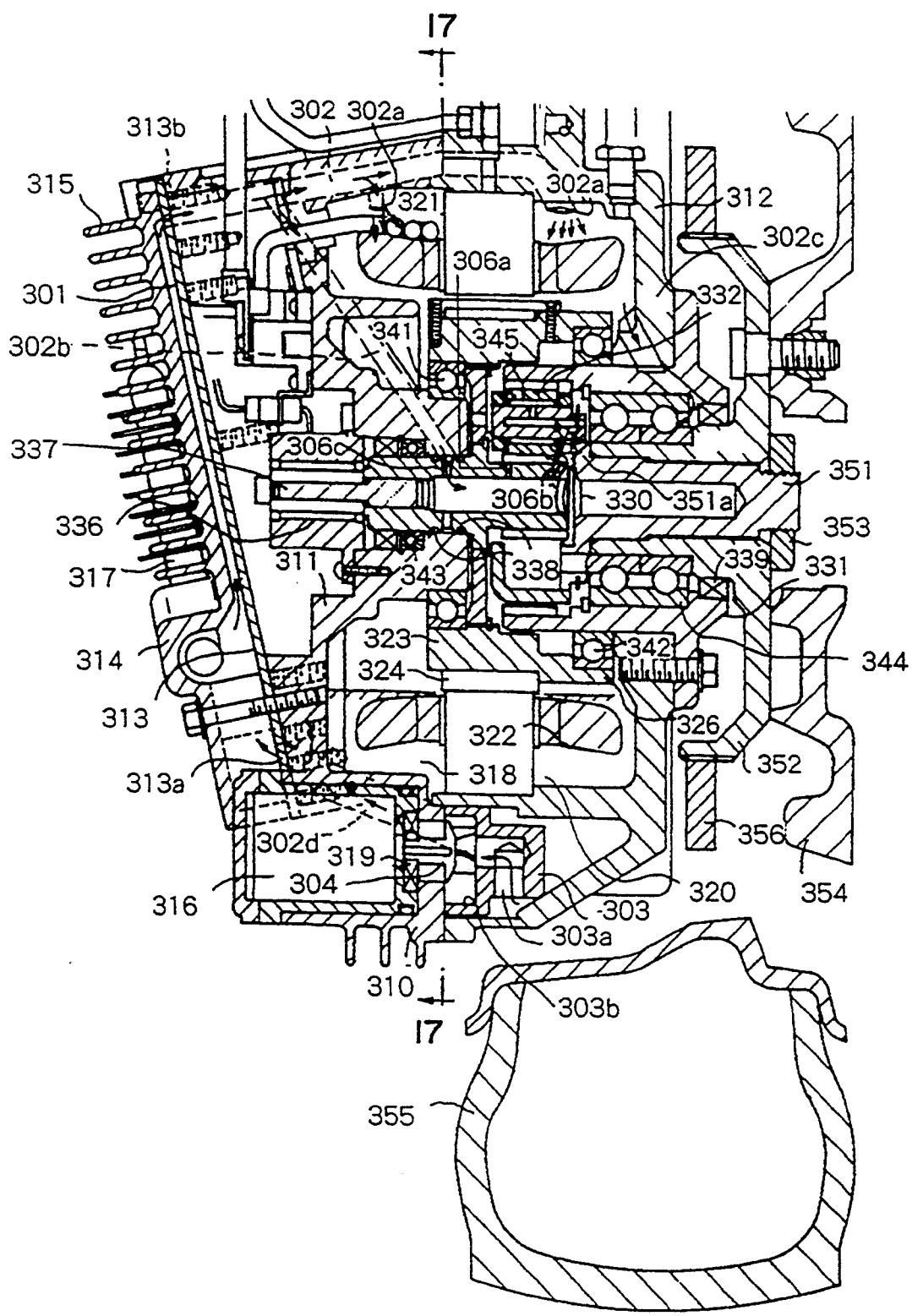
FIG. 15 is a vertical section showing a fifth embodiment of an electric motor cooling system according to the present invention in the form of a wheel motor of an electric vehicle.
Figure 16:
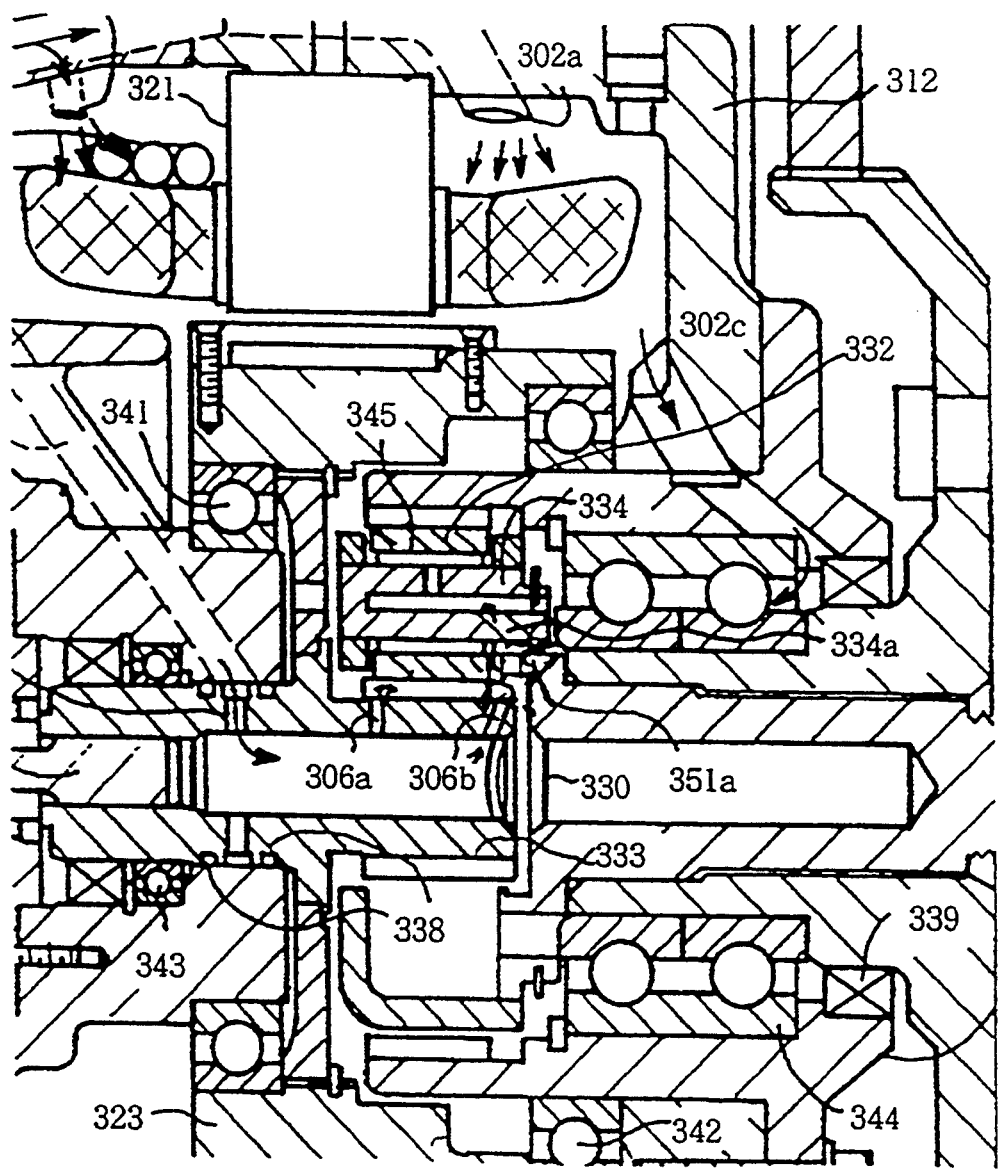
FIG. 16 is an enlarged portion of FIG. 15.
Figure 17:
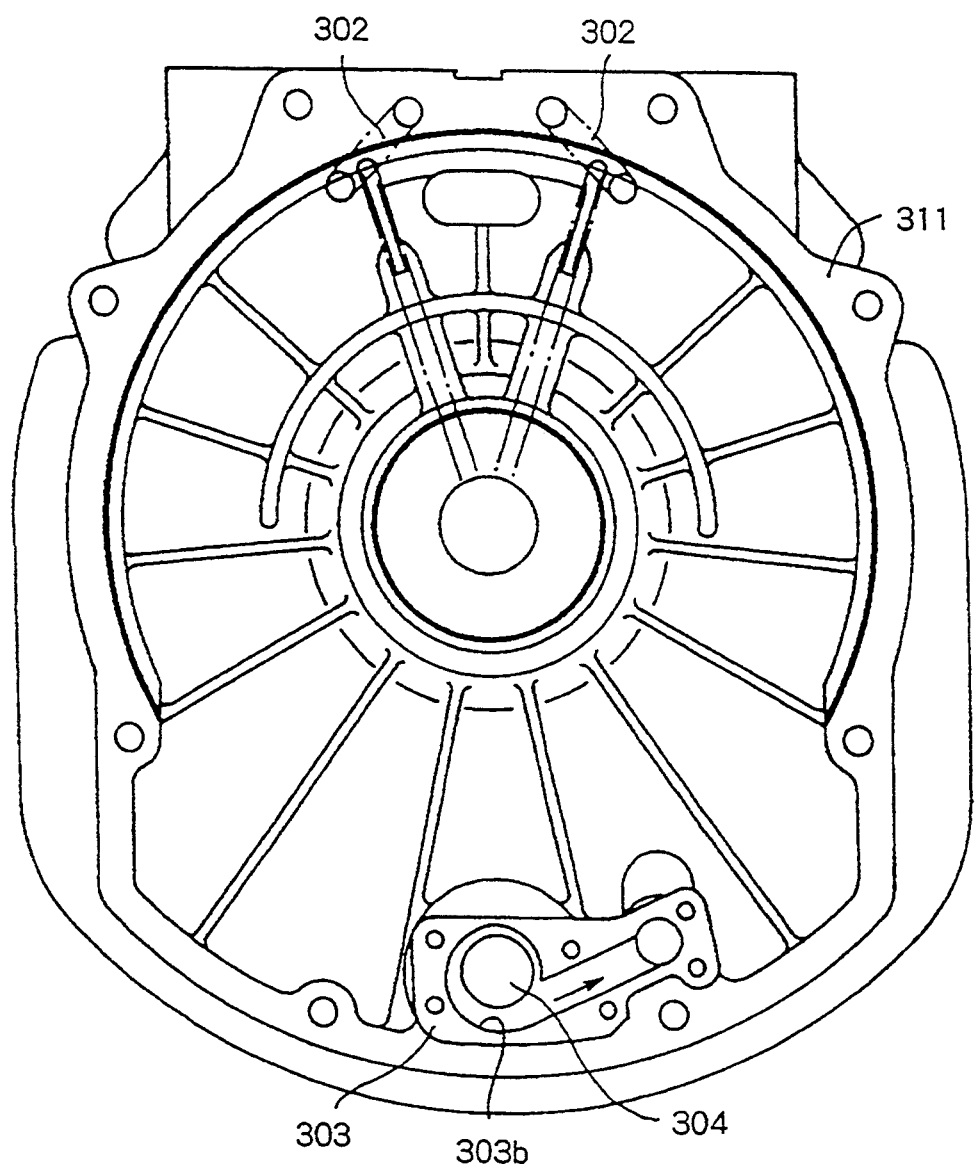
FIG. 17 is a vertical section taken along line 17—17 of FIG. 15.

FIGS. 15 and 16 show a fifth embodiment of the present invention wherein a casing body 310 is divided in half to provide a support side cylindrical housing 311 and a wheel side housing 312, both of which are fixed together by means of bolts (not shown). The support side housing is closed by a plate 313 and a cover 314 bolted thereto (bolts not shown) at the side opposite the wheel side housing 312 and is fixed on a support (not shown) by means of bolts. All oil pump motor 316 feeds oil from a bottom oil sump 318 through the oil passage 301 which is formed between the plate 313 and the cover 314. An oil seal 319 seals the oil pump motor 316. The cover 314 is provided on its outer surface with a number of cooling fins 315 and heat pipes 317. The oil passage 301 leads to an output port 313b (in plate 313) at its upper end to provide communication with an oil passage 302 formed at the upper end of the casing. The oil passage 302 leads to an oil discharge port 302a. In the casing body 310 thus constructed, there is mounted an electric motor 320 having a hollow rotor 323, in which a planetary gear reduction gear mechanism 330 is mounted.

The electric motor 320 has its stator 321 wound with a coil 322. The rotor 323 of the electric motor 320 is constructed of a hollow iron core, on which a permanent magnet 324 is fixed by means of a holding band. The rotor 323 has at its one end a thin wall portion 326 projecting beyond the permanent magnet 324. In the embodiment illustrated by FIGS. 15 and 16, the end of the rotor 323 at the side of the housing 311 is supported by a ball bearing 341, and, at the other end, the thin wall portion 326 is rotatably supported by a ball bearing 342. The planetary gear reduction gear mechanism 330 has its ring ring 331 press-fitted in the housing 312 and fixed thereto by means of bolts.

The planetary gear reduction gear mechanism 330 has a sun gear 333 supported at the side of the housing 311 by a ball bearing 343 and splined to the hollow interior of the rotor 323. A resolver shaft 337 fitted within the sun gear 333 is monitored by a resolver 336. Moreover, the sun gear 333 has a hollow providing a lubrication oil passage 302b communicating with the oil passage 302 so that it may receive lubrication oil through the oil passage 302b. A radial passage 306c through sun gear 333 provides fluid communication between the sun gear hollow and oil passage 302b and is sealed by seal ring 338 at the juncture with oil passage 302b.

A pinion shaft 334 is connected to an output carrier 351 acting as the output spindle, and a planetary gear 332 is rotatably supported on the pinion shaft 334 by a needle roller 345 and is arranged to mesh with the ring gear 331 and the sun gear 333 at all times.

An output flange 352 is splined to the outer circumference of the output carrier 351, is axially fixed by a nut 353 and is supported by a double row angular bearing 344 in turn supported by the ring ear 331. The double row angular bearing 344 receives lubrication oil through an oil passage 302c and is sealed by an oil seal 339. The output flange 352 has a brake disk 356 splined thereto and has attached thereto a wheel 354 holding a tire 355 by means of bolts and nuts.

Since the planetary gearing reduction gear mechanism 330 is arranged within the hollow portion of the rotor 323, the axial length can be shortened. Even if the rotor 323 is axially shortened and given a larger diameter, there arises no problem because the ball bearings 341 and 342 provide two support points while clamping the two rotor ends close to its outer circumference from two sides. Moreover, the concentricity can be improved to reduce fluctuations in the inclination of the rotor 323 and in the gap between the rotor 323 and the stator 321.

The casing body 310 has, in its lower portion, an oil sump 318, below which the pump chamber casing 303 having a suction port 303a is fixed to the housing 311 by means of a number of bolts to form a pump chamber 303b, with the suction port 303a in communication with the pump chamber 303b. As is apparent from FIG. 4, the pump chamber 303b is arranged with the blades 304 of the oil pump motor 316 acting as a centrifugal pump. Blades 304 are rotated by the oil pump motor 316 which is fixed to the housing 311.

As shown in FIG. 15, the pump chamber 303b communicates with an oil passage 302 formed in the housing 311 and with an oil passage 301 formed between the plate 313 and the cover 314 through an input port 313a formed in the plate 313.

Figure 18:
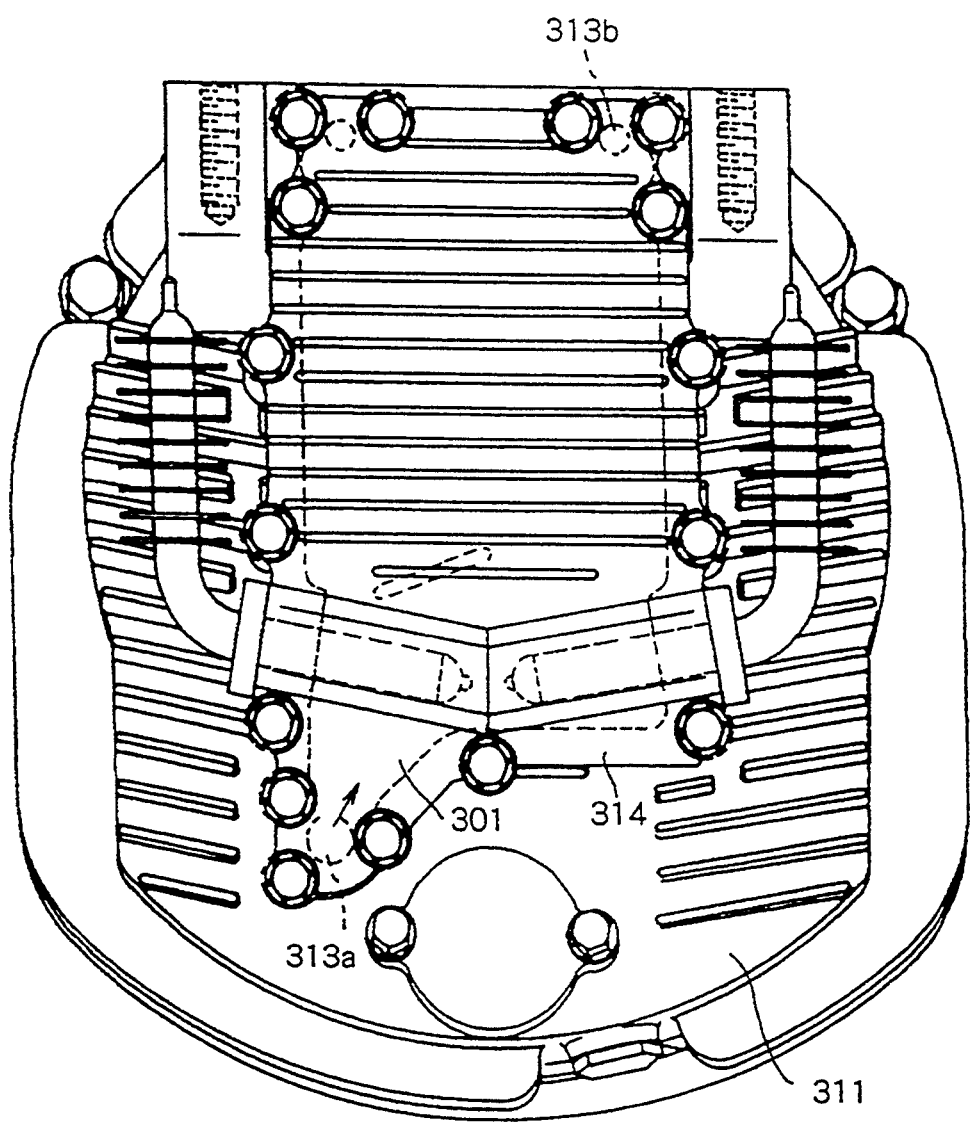
FIG. 18 is an elevational view of the left (cover) side of FIG. 15.

As shown in FIG. 18, the oil passage 301 at its upper end communicates with the oil passage 302 formed in the housing 311 through an output port 313b formed in the plate 313, and the discharge port 302a communicates with the space in the casing body 310 so that the oil may contact the coil 322 of the wheel driving motor. In other words, the cooling communication means of the wheel driving motor 320 is composed of the oil passage 301 communicating with the pump chamber 303b and the oil passage 302.

The lubrication system provides communication between the hollow interior of the sun gear 333 and the oil passage 306c through the oil passage 302b communicating with the oil passage 302 formed in the housing 311. The hollow interior of the sun gear 333 receives oil through the teeth of the sun gear 333. The planetary gear 332 receives oil through an oil passage 306a and through spaces in the needle roller 345. The pinion shaft 334 and the planetary gear 332 receive lubrication through an oil passage 306b, an oil passage 351a formed in the output carrier 351, and an oil passage 334a formed in the pinion shaft 334. Moreover, the space in the casing body 310 and the double row angular ball bearing 344 receive oil through the oil passage 302c formed in the housing 312.

Figure 14:
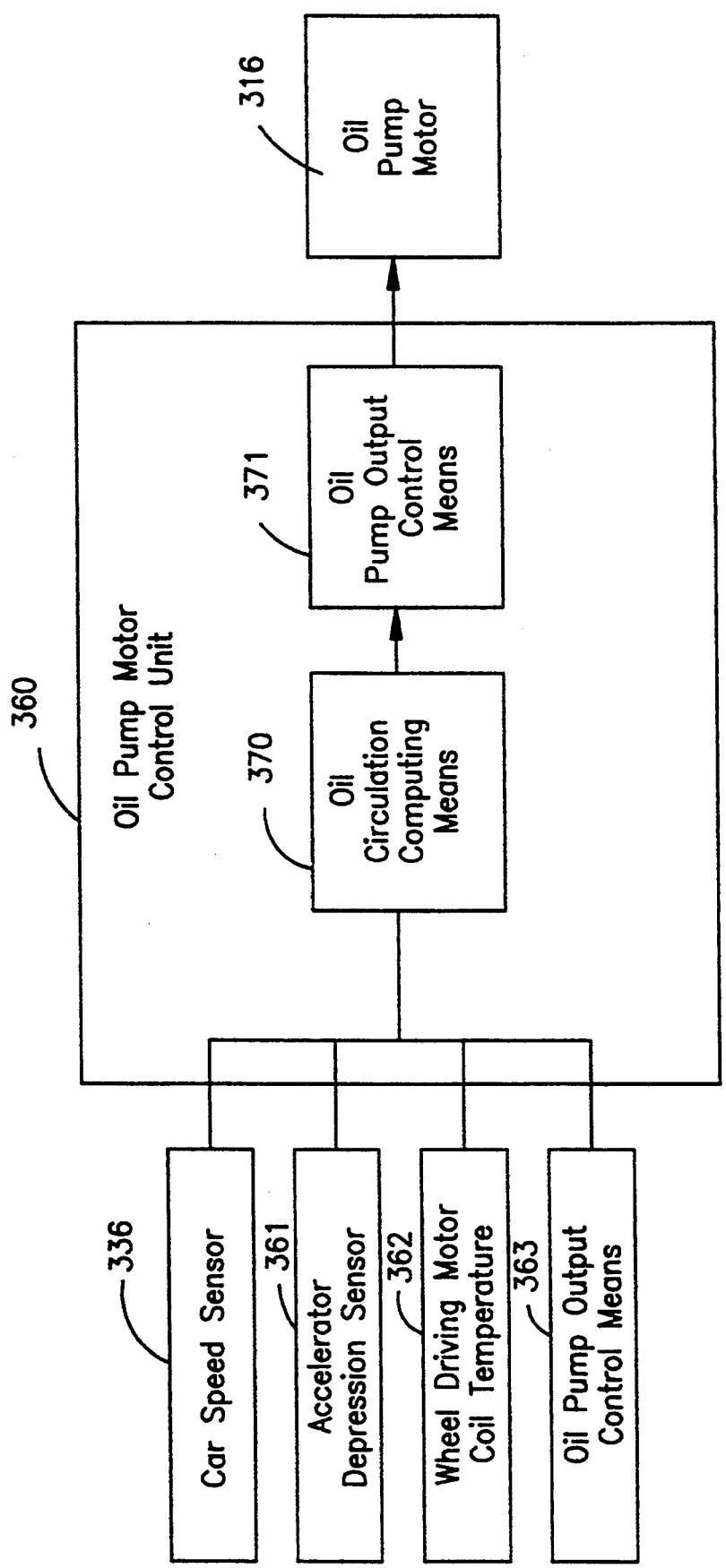
FIG. 14 is a block diagram illustrating control of an electric motor cooling system of the present invention.

In the present embodiment, as shown in FIG. 14, the oil pump driving motor 316 is connected to an oil pump driving motor control unit 360. This motor control unit 360 receives signals from an accelerator depression sensor 361, a motor RPM sensor (or car speed sensor) 336, and a coil temperature sensor 362 buried in the coil 322 of the stator 321.

The oil sump 318 is equipped with an oil temperature sensor 363, and the casing body 310 is equipped with an ambient temperature sensor (although not shown) on its exterior. Thus, the cooling system is composed of the oil sump 318, the oil pump motor 316, the blades 304, the motor control unit 360, the oil passages 301, 302, - - -, etc., the input port 313a, the output port 313b, the discharge port 302a, the oil pump 316 and the aforementioned various sensors.

The operations of the fifth embodiment will now be described.

When the accelerator pedal (not shown) is depressed, an electric current proportional to the degree of accelerator opening flows through the coil 322 of the wheel driving motor 320. As a result, the wheel driving motor 320 is energized and rotates the sun gear 333 or the spindle. Since, in this case, the current through the coil 322 is controlled by the control unit (not shown) responsive to the accelerator depression signal, the output signal from the motor RPM sensor 335 and the forward signal from a forward/reverse setting unit (not shown), the sun gear 333 or the spindle is rotated forward with a predetermined torque.

The rotation of the spindle or sun gear 333 is transmitted to the planetary gear 332 so that the planetary gear 332 rotates around the pinion shaft 334. As a result, the planetary gear 332 rotates on the axis of the spindle or sun gear 333 while meshing with the teeth of the ring gear 331. This rotation of the planetary gear 332 rotates the output carrier 351 and the rotational speed of the output carrier 351 is decelerated by the planetary gear reduction gear mechanism at a predetermined reduction rate to the rotational speed of the spindle or sun gear 333.

When the output carrier 351 rotates, the tires 355 are rotated through the output flange 352 and the wheels 354. As a result, the vehicle runs forward. If the accelerator pedal is further depressed, the torque of the wheel driving motor 32 is increased to accelerate the vehicle speed.

To run the vehicle backward, rotation of the carrier 351 can be reversed by setting the forward/reverse setting unit (although not shown) to the reverse.

When the coil 322 is fed electric current, it evolves heat because it has an internal resistance. In order to cope with this heat evolution, the oil pump motor 316 is energized to feed the oil in the oil sump 318 to the oil passage 301 which is formed between the cover 314 and the plate 313. The cover 314 forming the oil passage 301 is equipped with the cooling fins 315 and the heat pipes 317 so that it dissipates the heat received from the oil in the oil passage 301. The oil thus cooled passes through the output port 313b formed in the plate 313 to the oil passage 302 formed in the upper portion of the casing body 310. The oil is injected through the discharge port 302a of the oil passage 302 onto the coil 322 end to cool the coil 322 and returns along the oil guide to the oil sump 318 while contacting the coil. A portion of the oil injected through the discharge port 302a flows through the oil passage 302c to cool the double row angular ball bearing 344 supporting the ring gear 331.

A portion of the oil in passage 302 is fed through the oil passages 302b and 306c to the hollow rotating portion of the sun gear 333. The oil exits the hollow of the sun gear 333 through oil passages 306a and 306b and is pumped by the teeth of the planetary gear 332, the sun gear 333 and the ring gear 331 through the oil passages 351a and 334a, which are formed in the output carrier 351 and the pinion shaft 334, whereby all tooth surfaces and bearing portions, i.e. the frictional surfaces of the reduction gear mechanism 330 are lubricated so that their useful service lives are prolonged.

As shown in FIG. 14, the oil pump motor 316 is controlled by the motor control unit 360 on the basis of various control parameters, i.e. the individual output signals from the motor RPM sensor (or car speed sensor) 336, the accelerator depression sensor 361, the coil temperature sensor 362 and the oil temperature sensor 363.

Next, the method of controlling the oil pump motor 316 will be described.

Figure 19:
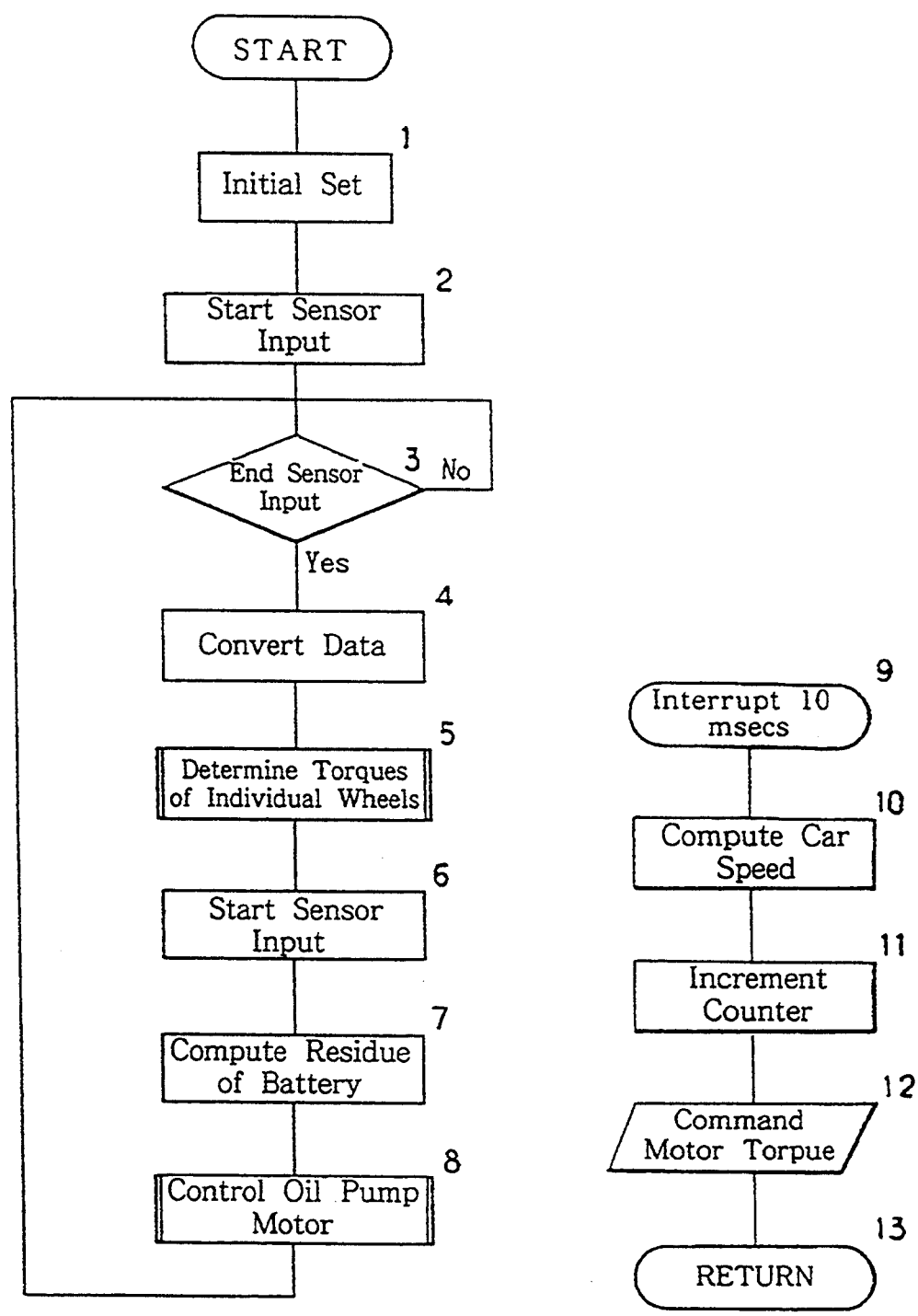
FIG. 19 is a flow chart showing an oil pump motor control main routine in accordance with one embodiment of the present invention.

First of all, the main routine of the control will be described with reference to FIG. 19. As shown in FIG. 19, after the initial setting of the control unit, the signals of the car speed sensor 336, the accelerator depression sensor 361, the coil temperature sensor 362 of the wheel driving motor 320, and the oil amount sensor 363 are input, and these input signals are processed to determine (at Step 5) the torques of the individual wheels (or tires) 355.

Figure 20:
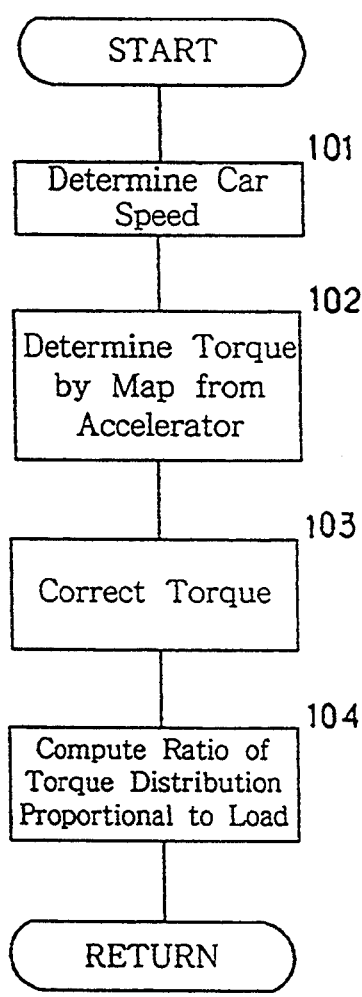
FIG. 20 is an individual wheel torque determining flow chart showing a subroutine for oil pump motor control in accordance with the embodiment of FIG. 19.
Figure 21:
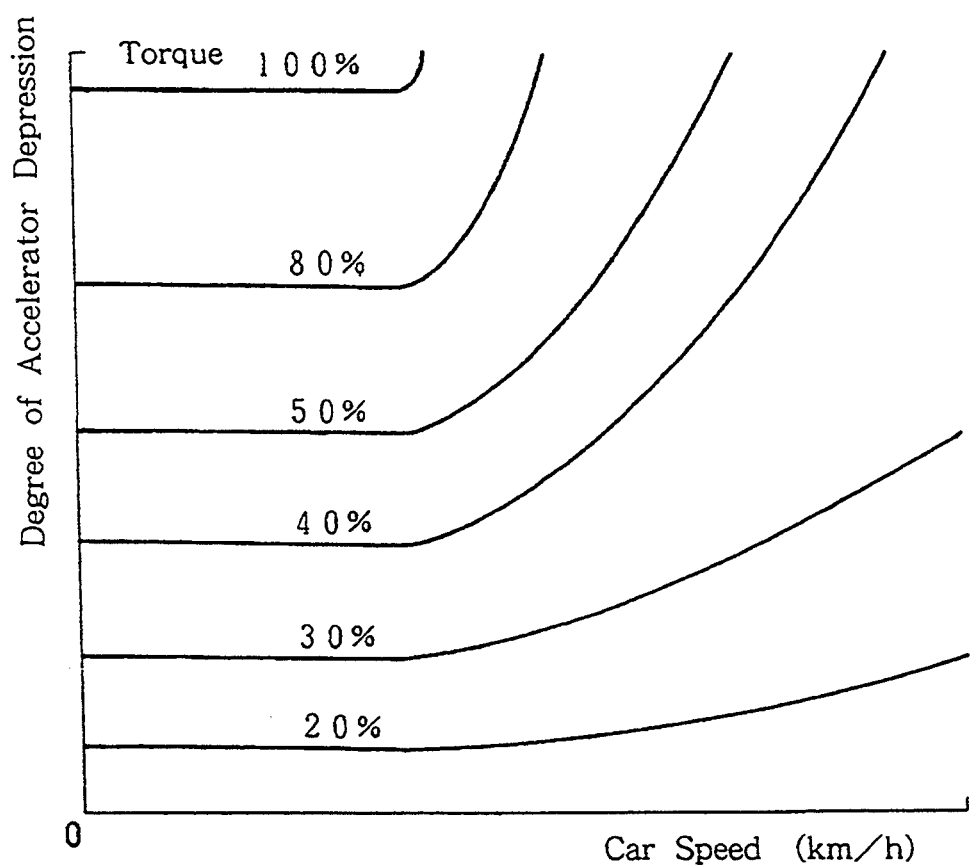
FIG. 21 is a torque map for use in the embodiment of FIG. 19.

The torques are determined (at Step 102) in accordance with the flow chart shown in FIG. 20 from the torque map (of FIG. 21) in accordance with the detected vehicle speed and the degree of accelerator depression. If, at this time, the wheel 355 slips, the amount of torque is corrected (at Step 103) to suppress the slip and to retain an effective driving force and vehicle safety. After the amounts of torque of the individual wheels 355 are determined, input from sensors for battery voltage and battery current (not shown) is started (at Step 6) to compute (at Step 7) the amount of residual battery power, because it takes considerable time to fetch the data of the individual sensors. The amount of residual battery power may be computed, for example, as taught in copending U.S. application Ser. No. 07/693,519 filed Apr. 24, 1991, the teachings of which are incorporated herein by reference. In case a lead battery is used, the determined amount of torque is high for a large degree of accelerator depression during acceleration or uphill running and the battery output voltage will drop. Therefore, the computed residual battery power is used to correct the torque command value, thereby to prevent an excessive drop in the cycle lifetime or charge lifetime of the battery.

The torque thus determined commands (at Step 12) that the amount of torque at each wheel be output according to an interrupt routine of 10 msecs for the motor torque command, as shown in FIG. 19. After this, in Step 8 the oil circulation flow rate for the oil pump is determined as illustrated in FIG. 22.

Figure 22:
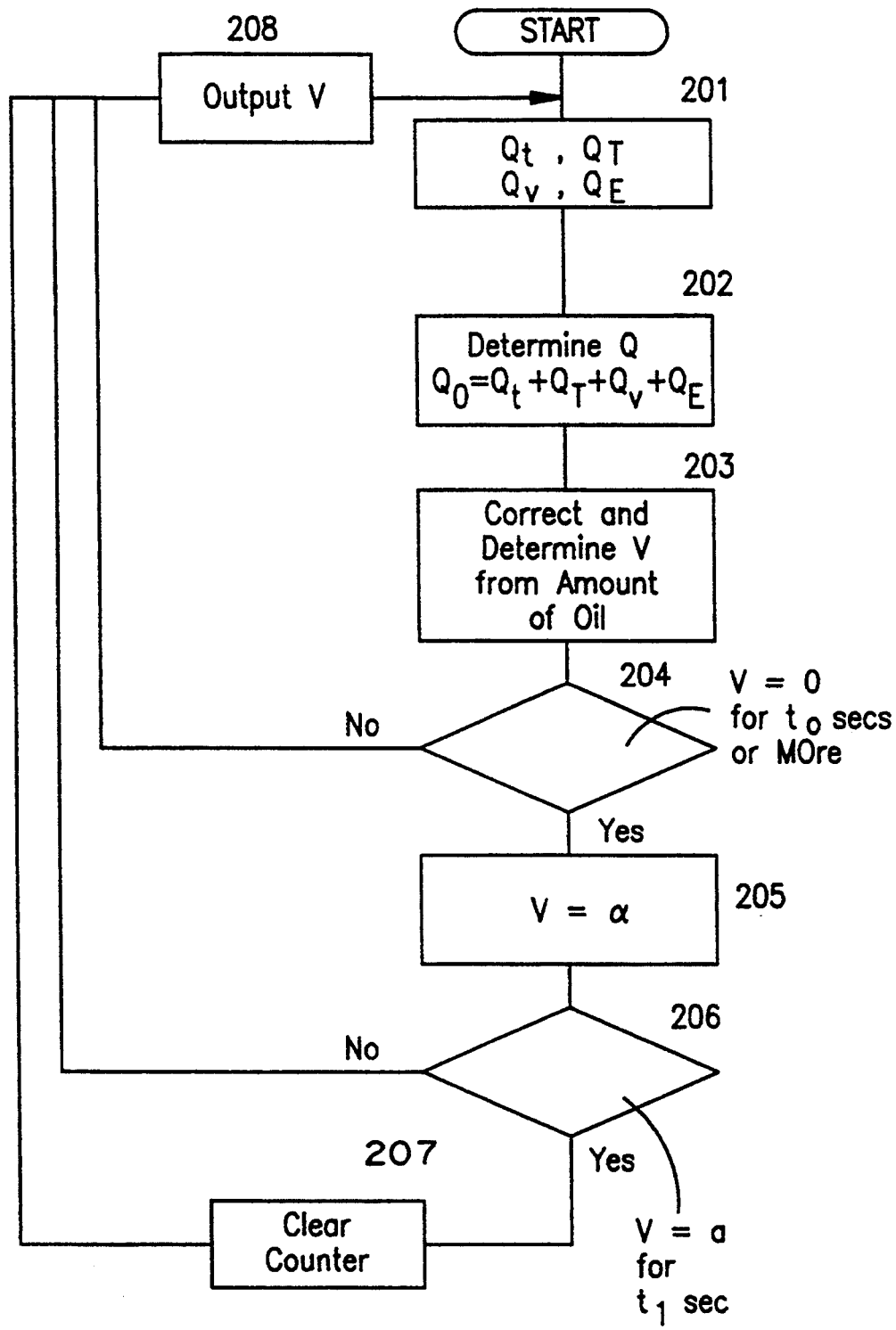
FIG. 22 is a flow chart showing a subroutine for determining the amount of oil to be circulated by the oil pump in accordance with the embodiment of FIG. 19.
Figure 23:
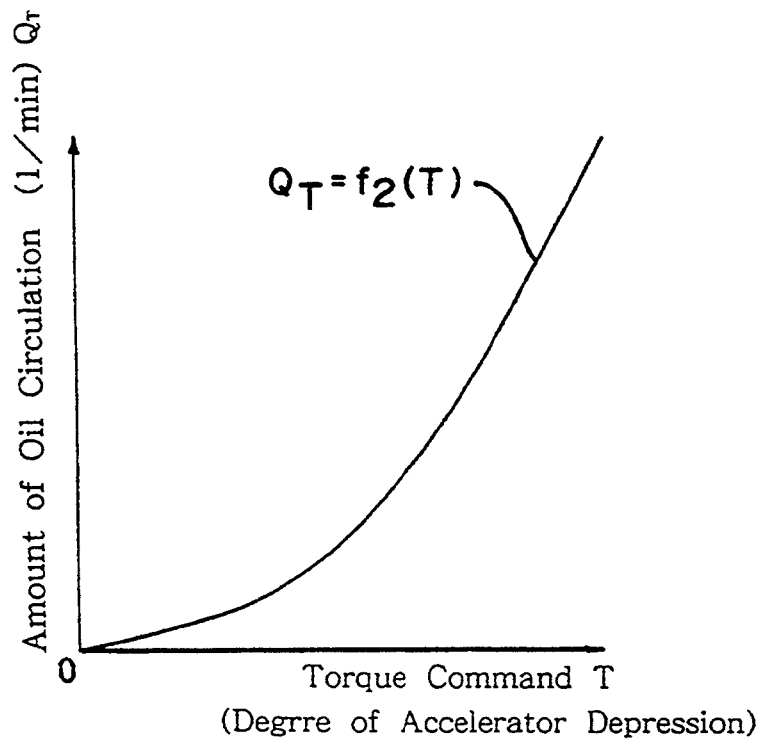
FIG. 23 is a map for determining the amount of oil circulation responsive to a torque command.

As shown in FIG. 22, the amount of oil circulation $Q_t$ is determined as a function of the coil temperature of the wheel driving motor 320 and is added to an amount of oil circulation $Q_t$ determined in accordance with the torque command or with another value computed in the torque computing means (not shown) on the basis of the inputs from vehicle speed sensor 336 and the accelerator depression sensor 361. In order to determine the amount of oil circulation accurately, the following steps may be followed. Specifically, the amount of oil circulation $Q_v$ for cooling the frictional surfaces of the motor components and the amount of oil circulation $Q_E$ for changing the amount of heat dissipation from the electric motor casing in accordance with the vehicle speed are computed (in Step 201) by the individual computing means (not shown). These amounts are then added to compute (in Step 202) a total amount of oil circulation $Q_o$. It should be noted that the individual rates of oil circulation $Q_T$, $Q_t$, $Q_v$ and $Q_E$ are determined from the maps of FIGS. 23, 24, 25 and 26.

The amount (rate) of oil circulation $Q_T$ determined in accordance with the torque command is computed by the following equation:

$$Q_T = \text{(Oil Density)} \times \text{(Specific Heat)} \times \text{(Volume)} \times \{\text{(Current through coil)}^2 \times \text{(resistance of Coil)}\} \div \{\text{(Heat Conductivity)} \times \text{(Coil Surface Area)}\}.$$

The amount (rate) of oil circulation $Q_t$ dependent upon coil temperature is determined from a preestablished relationship between the coil temperature and the amount of oil and shown in FIG. 24. The amount (rate) of oil circulation $Q_v$ for cooling the frictional surfaces of the motor components is that necessary to remove the total of the amounts of heat generated frictionally, so as to reduce the friction and cool the bearings and gears of the electric motor. Thus, the amount (rate) $Q_v$ is determined from the following equation:

$$Q_v = \beta \times \text{(Feed of Oil to Bearings)}$$
$$(\beta: \text{constant})$$

The amount of oil feed for a bearing is determined, for example, by the following equation:

$$\text{Oil Feed} = \{\text{(Frictional Force)} \times \text{(Rolling Circumferential Speed of Frictional Surface)}\} \div \{2 \times \text{(Specific Heat of Oil)} \times \text{(Temperature Rise of Oil Film)}\}.$$

The amount (rate) of oil circulation $Q_E$ for heat dissipation from the motor casing depends upon the vehicle speed and takes into consideration the fact that the heat transfer rate is increased if the heat conductivity between the motor casing surface and the ambient air rises, e.g. by an increase in vehicle speed. Thus, the amount of oil circulation $Q_E$ is computed by the following equation:

$$Q_E = UA\Delta T$$
($U$: heat conductivity; $A$: case surface area; and
$\Delta T$: (case surface temperature) − (ambient temperature)).

An ambient temperature sensor (not shown) is used in the determination of the aforementioned amount of oil circulation $Q_E$.

The driving force thus determined for the output of the total amount of oil circulation is corrected (at Step 203) according to the following method, based on the oil temperature determined by the oil temperature sensor 363.

Figure 27:
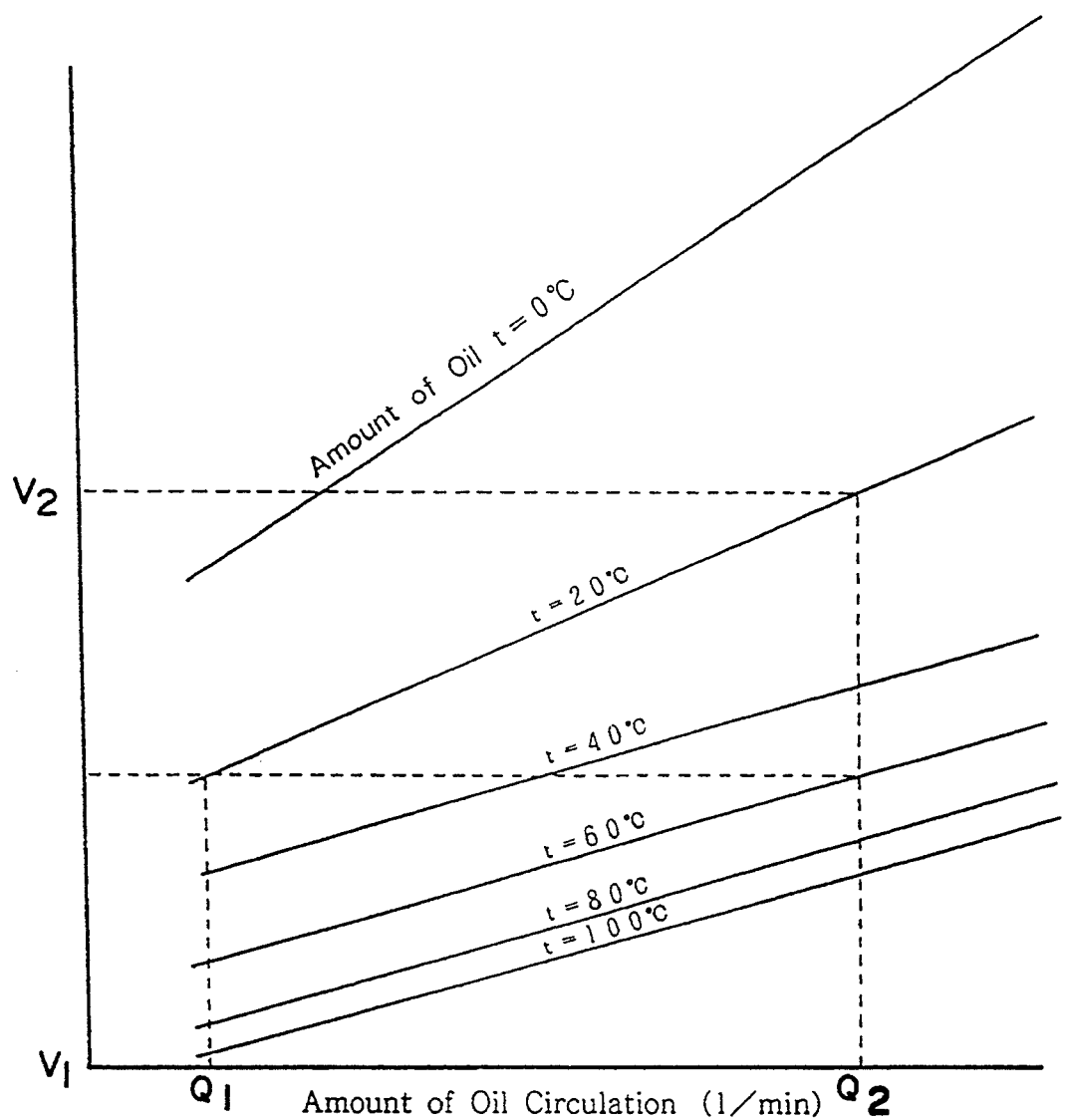
FIG. 27 is a map for determining a corrected value for voltage applied to the oil pump motor against the amount of oil circulation, in terms of oil temperatures.

According to this method, as shown in FIG. 27, the oil pump applied voltage $V=V_1$ so that the necessary total amount of oil circulation $Q_2$ (1/min) determined at Step 202 (as shown in FIG. 22) may be output if the reference oil temperature is at 60° C. If the oil temperature at this time is 20° C., the actual circulation of oil circulation is $Q_1$ so that the performance of the wheel motor 306 drops due to insufficient cooling. Therefore, an oil pump applied voltage $V$ is set at $V_1$ to provide the total amount of oil circulation $Q_o$ required.

Thus, an applied voltage $V$ is output (at Step 208) so long as the car is neither started nor stopped.

As a result, coil cooling is effectively accomplished to prevent any damage of the wheel driving motor and to improve the durability of the same.

Since the motor applied voltage $V$ of the oil pump motor 316 is set at $V=0$ when the car is started or stopped, $V=\alpha$ ($\alpha$: positive constant) is output (at Step 205) if $V=0$ for $t_o$ secs or more so that the lubrication maintains a suitable oil film on the moving parts. If $V=\alpha$ after elapse of a constant time (e.g., $t_2$ secs), the time counting is interrupted, and the counter is cleared.

Figure 28:
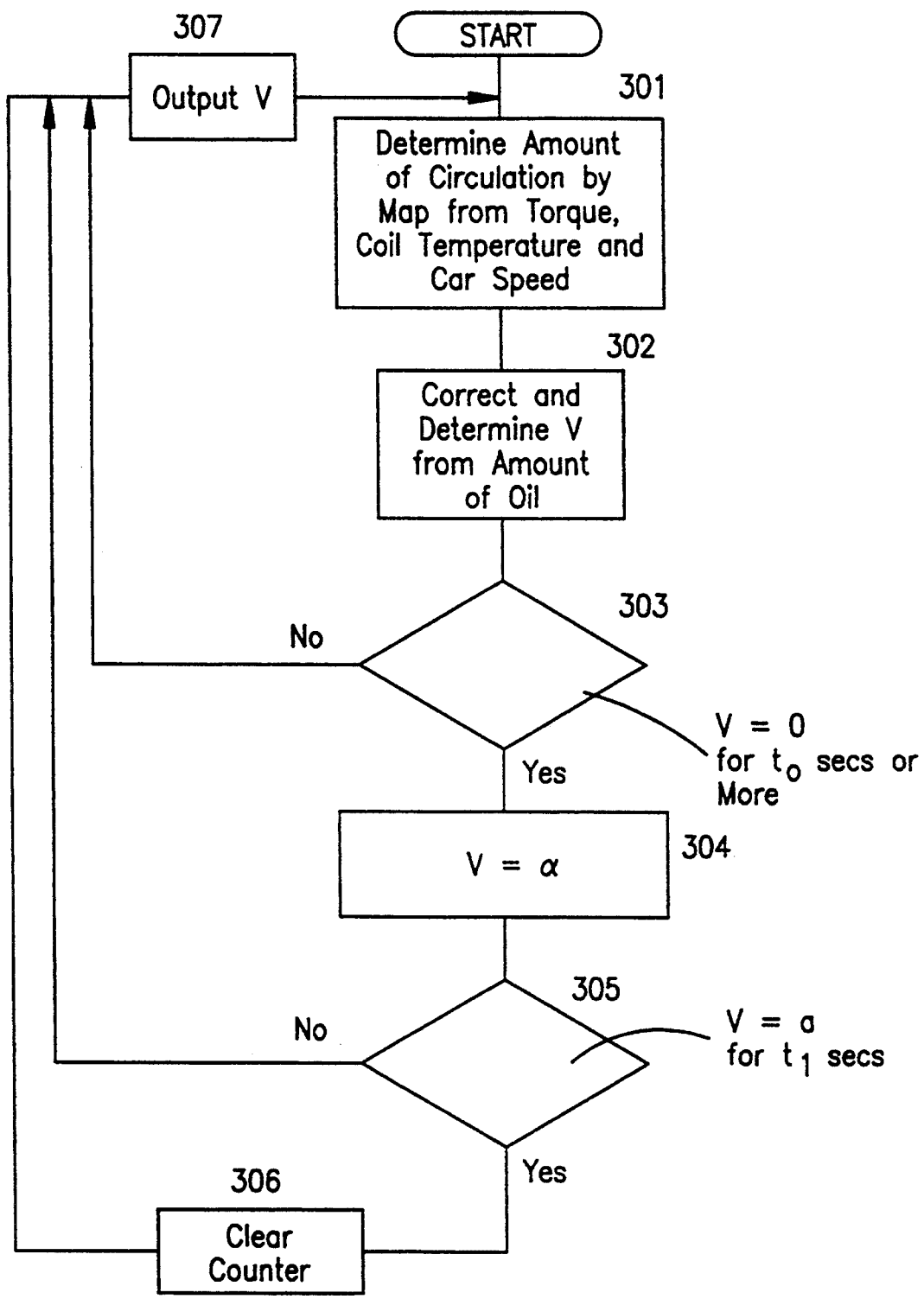
FIG. 28 is an oil pump motor control flow chart of another embodiment of the present invention.
Figure 29:
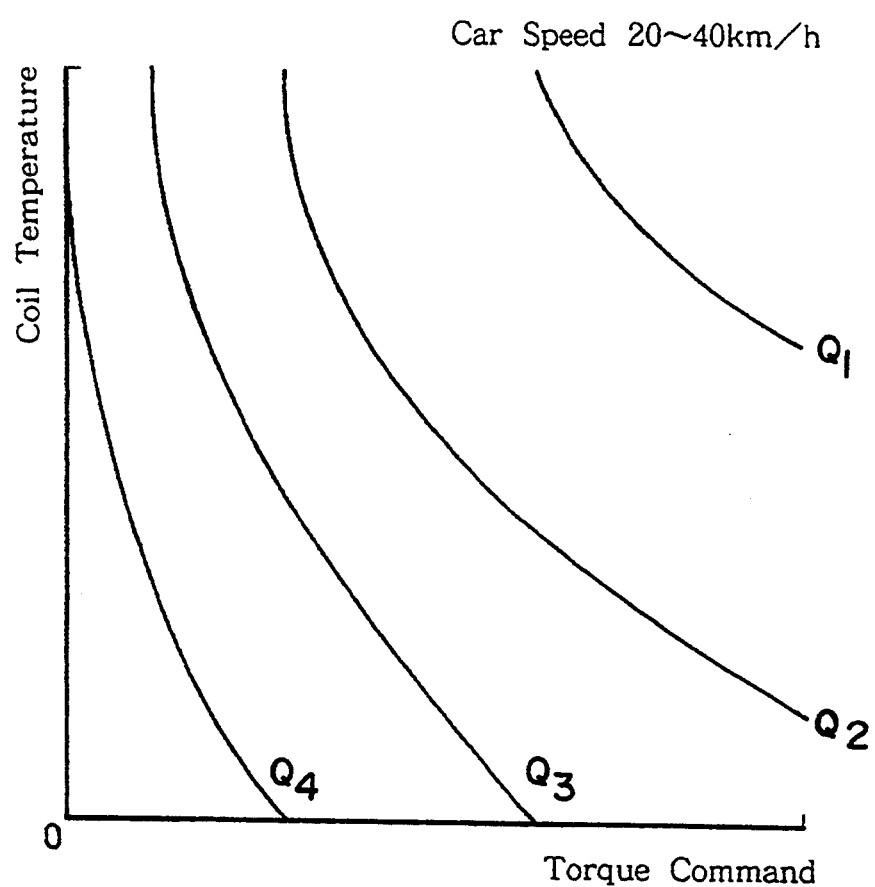
FIG. 29 is an oil circulation computing map for the embodiment of FIG. 28.
Figure 30:
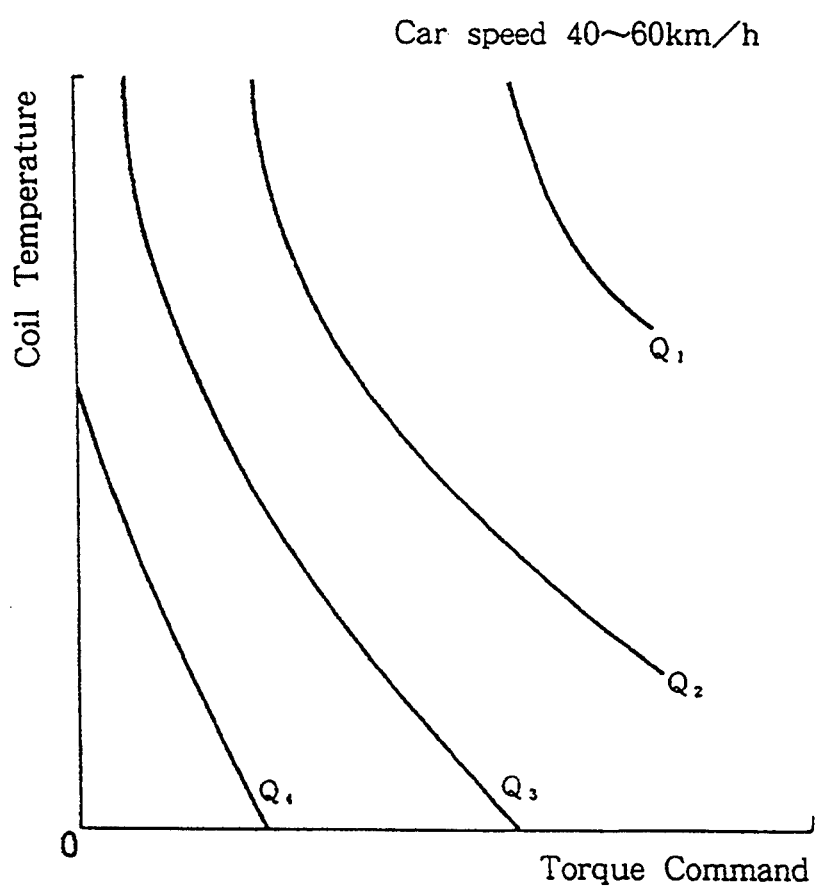
FIG. 30 is another oil circulation computing map for the embodiment of FIG. 28.
Figure 34:
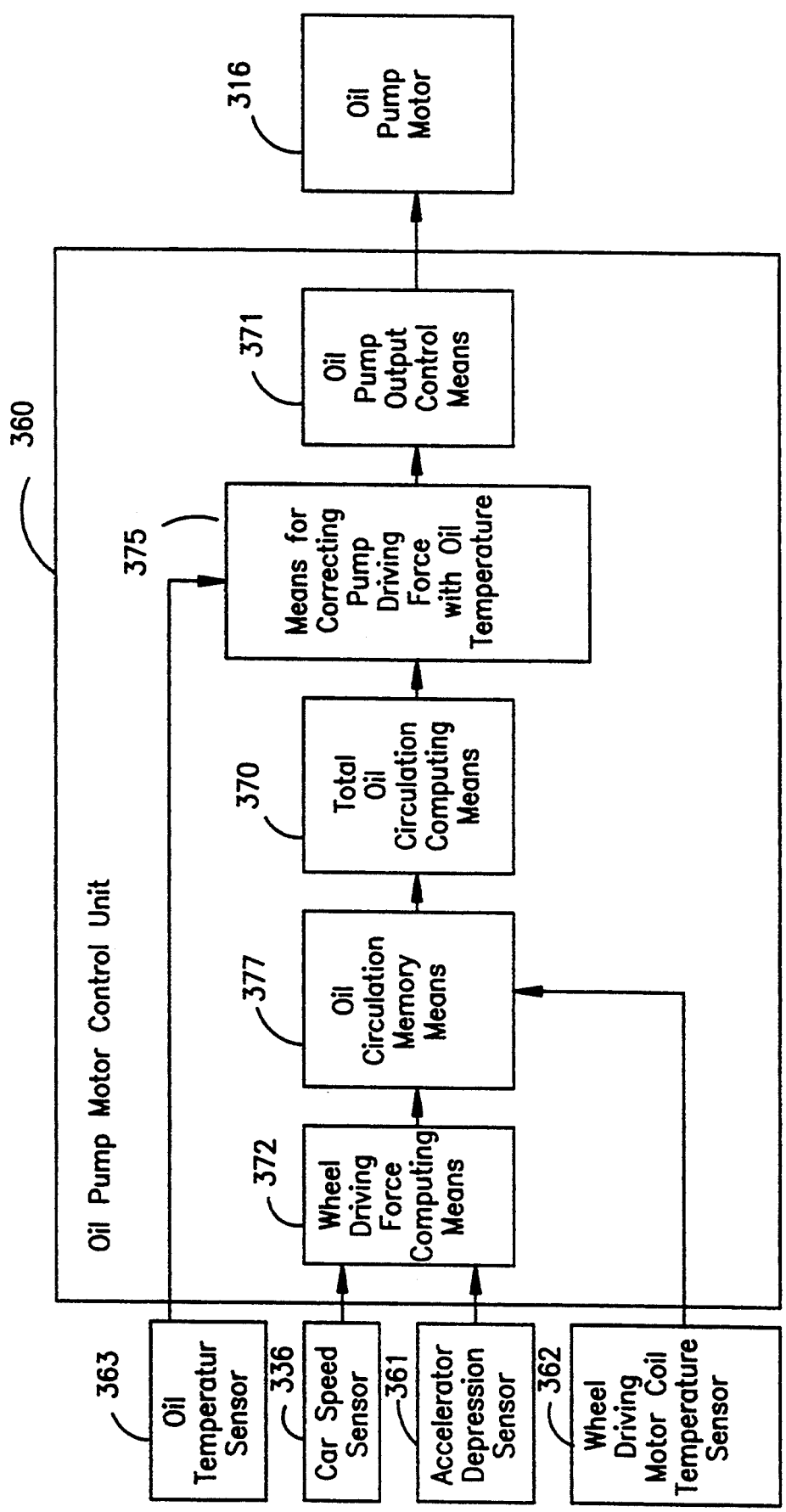
FIG. 34 is a block diagram illustrating control of an electric motor cooling system according to yet another embodiment of the present invention.

The control of the oil pump may follow the method shown in FIG. 28. According to this method, in place of Steps 201 and 202 for computing the total amount of oil circulation $Q_o$ shown in FIG. 22, the preset amount of oil circulation $Q_o$ is computed on the basis of the torque, the coil temperature of the wheel driving motor, and the vehicle speed, as in Step 301. The amount (rate) of oil circulation $Q_o$ is determined from a memory (not shown) in the oil pump motor control unit 360, as determined in advance for each car speed, as shown in FIGS. 29 and 30. The control block diagram is shown in FIG. 34.

Figure 31:
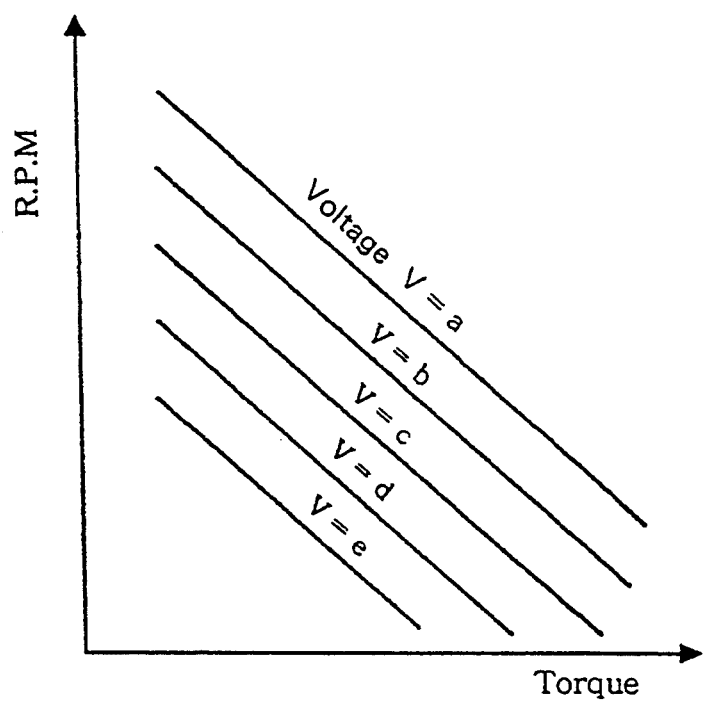
FIG. 31 is a graph showing torque plotted against RPM for various voltages to the oil pump motor in accordance with embodiment of FIG. 28.

The relationship between the torques at individual voltages and the RPM of the oil pump motor are as shown in FIG. 31. Thus, the necessary amount of circulation is output by applying a voltage to the oil pump in accordance with the situation of each wheel driving motor.

Figure 32:
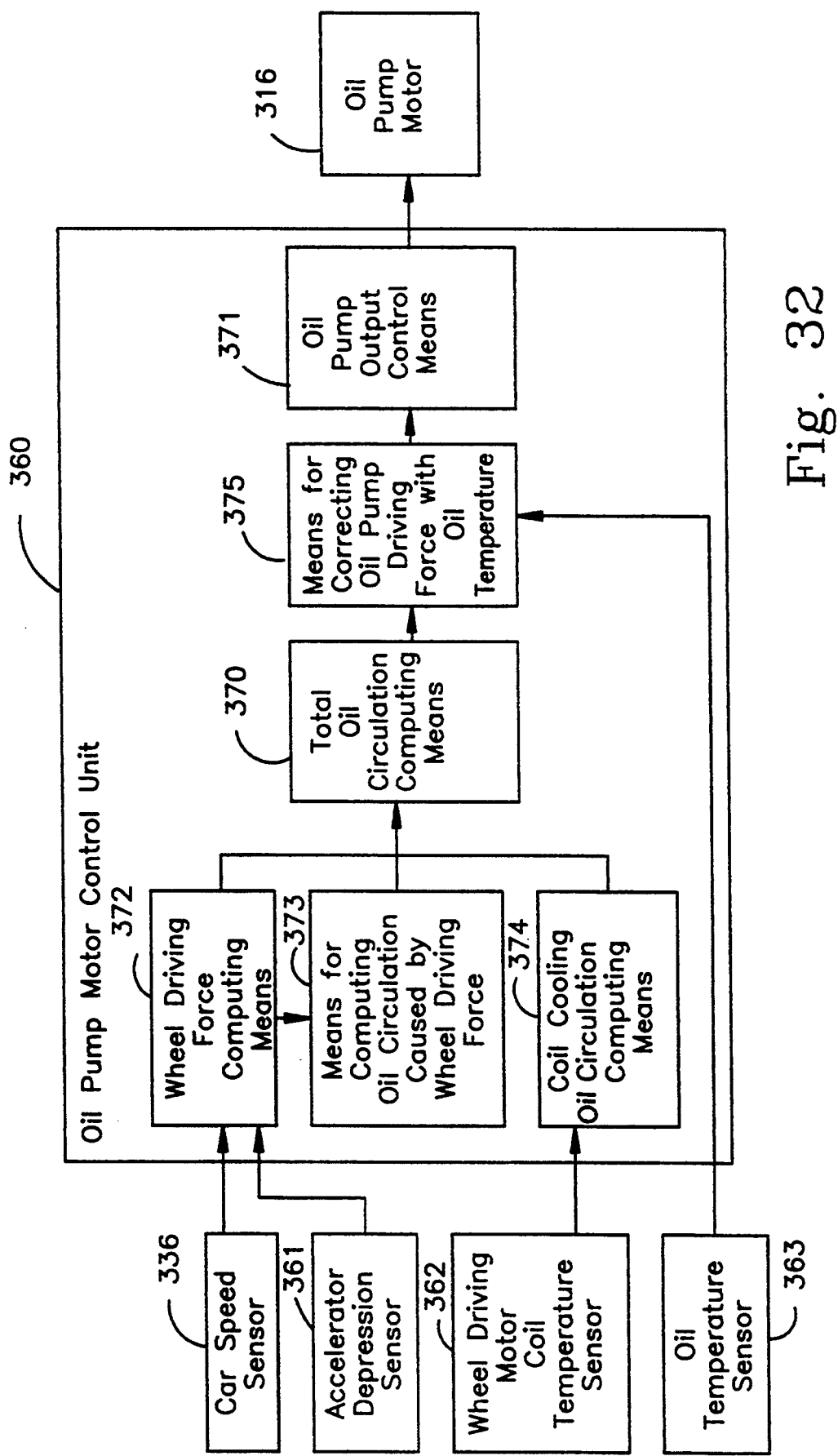
FIG. 32 is a block diagram illustrating control of an electric motor cooling system according to an embodiment of the present invention.

Another embodiment of control of electric motor cooling, in accordance with the present invention is shown in FIG. 32.

The cooling control unit illustrated in FIG. 32 includes car speed sensor 336; an accelerator depression sensor 361 and a wheel driving motor driving force computing means 372 which computes the driving force of the wheel driving motor 320 on the basis of signals from car speed sensor 336 and the accelerator depression sensor 361. Oil circulation computing means 373 is responsive to a driving force command and computes the necessary amount of oil circulation on the basis of the driving force computed by driving force computing means 372. A coil temperature sensor 362 is provided for the wheel driving motor 320. Plural oil circulation computing means 374 compute the necessary amount of oil circulation on the basis of the detected coil temperature of the coil temperature sensors 362. Total oil circulation computing means 370 computes the total amount of oil circulation by adding the amounts of oil circulation computed by the plural oil circulation computing means 374. Oil pump driving force correcting means 375 corrects the value of the total amount of oil circulation computed by the total oil circulation computing means 370, on the basis of oil temperature detected by an oil temperature sensor 363. Oil pump output control means 371 controls the oil pump motor 316 responsive to the value for the total oil circulation computed by the oil pump driving force correcting means 375.

In this embodiment of motor cooling control, the total amount of oil circulation is computed by adding (1) the amount of oil circulation computed on the basis of the driving force of the wheel driving motor 320 which, in turn, is computed from the detector vehicle speed and the degree of accelerator depression and (2) the amount of oil circulation necessary for coil cooling, computed on the basis of the coil temperature of the wheel driving motor 320. The oil pump driving force corresponding to that total value is corrected on the basis of the actually measured oil temperature, so that the oil pump is controlled to output the aforementioned total amount of oil circulation.

Figure 33:
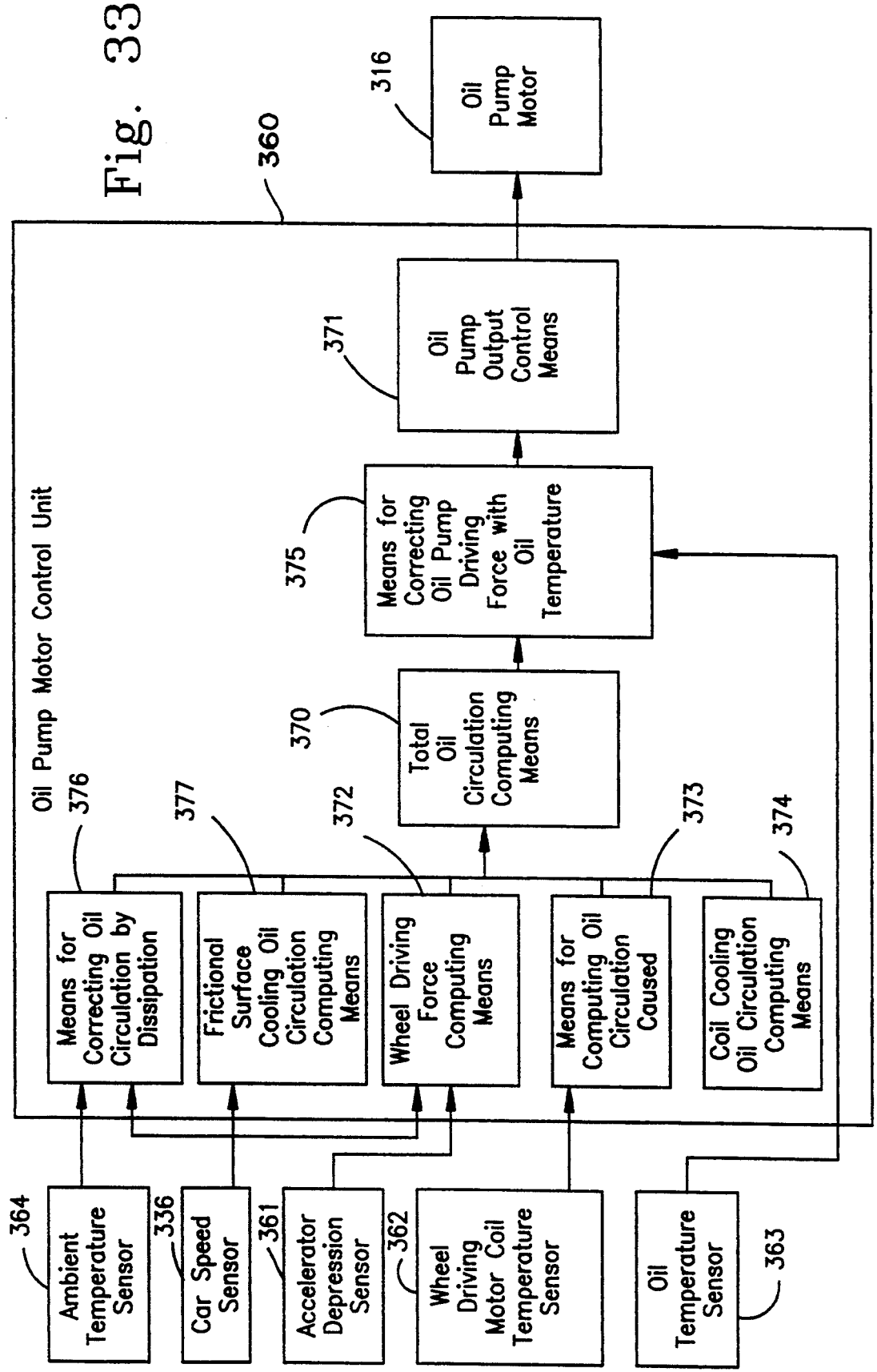
FIG. 33 is a block diagram illustrating control of an electric motor cooling system according to another embodiment of the present invention.

Another embodiment of a cooling oil control unit is shown in FIG. 33 and includes, in addition to the components of the electric motor cooling unit of FIG. 32, friction surface cooling oil circulation computing means 377 for correcting the value for total amount of oil circulation computed by the total oil circulation computing means by computing and adding the amount of cooling oil circulation necessary for cooling the friction surfaces of the components of the electric motor, determined on the basis of the vehicle speed detected by speed sensor 336. Oil circulation correcting means 376 corrects the value for total amount of oil circulation computed by the total oil circulation computing means 370 in accordance with changes in the heat dissipation computed on the basis of signals from car speed sensor 336 and an ambient temperature sensor 364.

The total amount of oil circulation can be determined more accurately than with the unit of FIG. 32 by correcting the total amount of oil circulation by addition of the amount of frictional surface cooling oil circulation necessary for cooling the frictional surfaces of the components of the electric motor, as computed on the basis of the vehicle speed and any change in the rate of heat dissipation, in turn, computed on the basis of the detected values for vehicle speed and the ambient temperature.

Yet another motor cooling control unit for a vehicle is shown in FIG. 34 and includes a vehicle speed sensor 336, a coil temperature sensor 363, an accelerator depression sensor 361, an oil temperature sensor 363 and wheel driving motor driving force computing means 372 for computing the driving force of the wheel driving motor 320 on the basis of signals from the car speed sensor 336 and the accelerator depression sensor 361. An oil circulation memory 377 stores maps correlating necessary amounts of oil circulation with detected vehicle speed, the driving force and the coil temperature. The oil circulation computing means 370 determines the necessary amount of oil circulation by applying against the maps stored in the oil circulation memory means 377, detected vehicle speed, the driving force computed by the wheel driving motor driving force computing means 372, and the detected coil temperature. The oil pump driving force correcting means 375 corrects total amount of oil circulation computed by total oil circulation computing means 370 on the basis of the detected oil temperature. The oil pump output control means 371 controls the oil pump responsive to the corrected value for the total amount of oil circulation.

In the embodiment described above, the oil pump is driven in accordance with predetermined values for necessary amounts of oil circulation which are mapped against values for vehicle speed, motor driving force and the coil temperature, which predetermined values have been modified in accordance with detected oil temperature.

Incidentally in the present embodiment, the control methods disclosed above are not limited to the motor shown in FIG. 15 but can also be applied to the drive units shown in FIGS. 2 and 9.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electric vehicle comprising: a wheeled frame having at least one pair of drive wheels; an electric drive motor, including a stator and a coil, for generating a first output torque;

a torque transmission train for transmitting said first output torque to said drive wheels;

oil circulating means for feeding oil to said drive motor and said torque transmission train, said oil circulating means comprising:

an oil sump:

oil distributing means for distributing oil to said electric drive motor and said torque transmission train for cooling and lubrication;

an electric prime mover separate from, in addition to and operable independently of said electric drive motor for generating a second output torque;

oil pump means for delivering oil from said oil sump to said oil distributing means; and pump drive means for transmitting said first and second output torques to said oil pump means, said pump drive means including mechanical drive means connecting said oil pump means and said torque transmission train, for transmitting the first output torque of said electric drive motor to said oil pump means.

2. An electric vehicle according to claim 1:

wherein said oil pump means includes a mechanical oil pump driven by the rotation of said electric drive motor and an electric oil pump driven by said electric prime mover; and wherein said oil distributing means includes:

a lubrication circuit for feeding the oil discharged from said mechanical oil pump to said torque transmission train for lubrication; and a cooling circuit for feeding oil discharged from said electric oil pump to said drive motor for cooling.

3. An electric vehicle according to claim 2, further comprising an oil passage connecting said lubrication circuit and said cooling circuit to allow oil for said cooling of said electric drive motor to be supplied by said mechanical oil pump through said lubricating circuit and to allow oil or said lubrication of said torque transmission train to be supplied by said electric oil pump through said cooling circuit.

4. An electric vehicle according to claim 3, further comprising means in said oil passage for controlling the flow rate of oil.

5. An electric vehicle according to claim 1, further comprising cooling means for cooling the circulated oil by heat exchange.

* * * * *